US011513391B2

(12) United States Patent
Ueba et al.

(10) Patent No.: US 11,513,391 B2
(45) Date of Patent: Nov. 29, 2022

(54) OPTICAL STRUCTURE COMPRISING A CONCAVE-AND-CONVEX-SHAPED INTERFACE HAVING A FLAT PORTION BETWEEN A HIGH REFRACTIVE-INDEX LAYER AND A LOW REFRACTIVE-INDEX LAYER AND DISPLAY DEVICE

(71) Applicant: Dai Nippon Printing Co., Ltd., Tokyo (JP)

(72) Inventors: Yosuke Ueba, Tokyo (JP); Tatsuaki Inoue, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 17/654,830

(22) Filed: Mar. 15, 2022

(65) Prior Publication Data

US 2022/0197089 A1    Jun. 23, 2022

Related U.S. Application Data

(63) Continuation of application No. 17/194,683, filed on Mar. 8, 2021, now Pat. No. 11,333,925, which is a
(Continued)

(30) Foreign Application Priority Data

Apr. 19, 2017    (JP) .............................. JP2017-082978
Apr. 9, 2018     (JP) .............................. JP2018-074850

(51) Int. Cl.
*G02F 1/13357*    (2006.01)
*G02B 30/27*      (2020.01)
(Continued)

(52) U.S. Cl.
CPC ....... *G02F 1/133606* (2013.01); *G02B 6/003* (2013.01); *G02B 6/005* (2013.01);
(Continued)

(58) Field of Classification Search
CPC .. G02B 27/0955; G02B 6/003; G02B 6/0025; G02B 5/02; G02B 5/0215; G02F 1/133634; G02F 2203/24
See application file for complete search history.

(56) References Cited

U.S. PATENT DOCUMENTS 10,408,989 B2    9/2019  Lee et al.
11,016,342 B2    5/2021  Ueba et al.
(Continued)

FOREIGN PATENT DOCUMENTS

JP    H07-043704 A1    2/1995
JP    3272833 B2       4/2002
(Continued)

OTHER PUBLICATIONS

International Search Report and Written Opinion (Application No. PCT/JP2018/016074) dated Jul. 17, 2018.
(Continued)

*Primary Examiner* — Paul C Lee
(74) *Attorney, Agent, or Firm* — Burr & Brown, PLLC

(57) ABSTRACT

An optical structure includes a high refractive-index layer and a low refractive-index layer laminated on the high refractive-index layer and having a refractive index lower than that of the high refractive-index layer, and is disposed on a display surface of a display device. An interface between the layers has a concave-and-convex shape, and each of a concavity and a convexity in the shape has a flat portion extending in a surface direction of the layers. A side surface of the concave-and-convex shape, which extends between the flat portions of the concavity and convexity, is a curved surface or a folded surface that is convex to the low refractive-index layer. A difference between a maximum angle and a minimum angle, which are defined between the side surface of the concave-and-convex shape and a normal
(Continued)

direction of the layers, is not less than 3 degrees and not more than 60 degrees.

5 Claims, 16 Drawing Sheets

Related U.S. Application Data continuation of application No. 16/891,424, filed on Jun. 3, 2020, now Pat. No. 11,016,342, which is a continuation of application No. 16/605,642, filed as application No. PCT/JP2018/016074 on Apr. 19, 2018, now Pat. No. 10,747,054.

(51) Int. Cl.
| | |
|---|---|
| *F21V 8/00* | (2006.01) |
| *G02B 27/01* | (2006.01) |
| *G02B 27/09* | (2006.01) |
| *G02F 1/1335* | (2006.01) |
| *G02B 13/18* | (2006.01) |
| *G02F 1/29* | (2006.01) |

(52) U.S. Cl.
CPC ......... *G02B 6/0025* (2013.01); *G02B 6/0053* (2013.01); *G02B 27/0101* (2013.01); *G02B 27/0172* (2013.01); *G02B 27/0955* (2013.01); *G02B 30/27* (2020.01); *G02F 1/1335* (2013.01); *G02F 1/133504* (2013.01); *G02F 1/133526* (2013.01); *G02B 13/18* (2013.01); *G02F 1/133607* (2021.01); *G02F 1/29* (2013.01)

(56) References Cited

U.S. PATENT DOCUMENTS

| | | | |
|---|---|---|---|
| 2002/0191128 A1 | 12/2002 | Okumura et al. | |
| 2004/0032546 A1 | 2/2004 | Ito | |
| 2005/0041174 A1* | 2/2005 | Numata | G02B 6/0053 349/61 |
| 2007/0285777 A1 | 12/2007 | Toyoshima et al. | |
| 2009/0316262 A1 | 12/2009 | Kittaka et al. | |
| 2011/0128483 A1 | 6/2011 | Park et al. | |
| 2011/0267686 A1* | 11/2011 | Kageyama | B60J 1/2041 359/359 |
| 2011/0310487 A1* | 12/2011 | Nagahama | E06B 9/386 359/599 |
| 2012/0182506 A1 | 7/2012 | Park et al. | |
| 2012/0300159 A1 | 11/2012 | Cho et al. | |
| 2012/0307179 A1 | 12/2012 | Nishimura et al. | |
| 2012/0307191 A1 | 12/2012 | Park et al. | |
| 2013/0335650 A1 | 12/2013 | Wakabayashi et al. | |
| 2015/0043221 A1* | 2/2015 | Lee | G02B 5/0236 362/311.06 |
| 2015/0102327 A1 | 4/2015 | Kim et al. | |
| 2016/0187699 A1* | 6/2016 | Ju | G02F 1/133504 349/96 |
| 2016/0252665 A1* | 9/2016 | Lee | G02B 5/3083 359/489.07 |
| 2017/0052287 A1 | 2/2017 | Lee et al. | |
| 2017/0082894 A1 | 3/2017 | Katsuta et al. | |
| 2018/0045876 A1 | 2/2018 | Lee et al. | |

FOREIGN PATENT DOCUMENTS

| | | | |
|---|---|---|---|
| JP | 2003-315786 A | 11/2003 | |
| JP | 2004-061601 A | 2/2004 | |
| JP | 2005-505019 A | 2/2005 | |
| JP | 3621959 B2 | 2/2005 | |
| JP | 2009-288799 A1 | 12/2009 | |
| JP | 2011-118393 A1 | 6/2011 | |
| JP | 2011-133878 A | 7/2011 | |
| JP | 2012-145944 A1 | 8/2012 | |
| JP | 2012-242842 A1 | 12/2012 | |
| JP | 2016-126350 A1 | 7/2016 | |
| JP | 2016-161943 A1 | 9/2016 | |
| KR | 10-2013-0008096 A | 1/2013 | |
| KR | 10-2015-0043860 A | 4/2015 | |
| KR | 10-1659241 B1 | 9/2016 | |
| KR | 10-2017-0021421 A | 2/2017 | |
| WO | 2006/051783 A1 | 5/2006 | |
| WO | 2016/175580 A1 | 11/2016 | |
| WO | WO-2016175580 A1 * | 11/2016 | ............... G02B 5/04 |

OTHER PUBLICATIONS

Japanese Office Action (Application No. 2017-082978) dated Jan. 26, 2018 (with English translation).
Japanese Office Action (Application No. 2017-082978) dated Jul. 10, 2018 (with English translation).
Japanese Office Action (Application No. 2018-074850) dated Oct. 11, 2019 (with English translation).
English translation of International Preliminary Report on Patentability (Chapter I) (Application No. PCT/JP2018/016074) dated Oct. 31, 2019.
Revocation Application (Korean Patent Application No. 10-2019-7030744) dated Dec. 4, 2020.
Korean Office Action (Application No. 10-2020-7015375) dated Jun. 9, 2021 (with English translation).
Chinese Office Action (Application No. 201880033065.2) dated Nov. 26, 2021 (with English translation).
Japanese Office Action (Application No. 2019-222379) dated Jan. 25, 2022 (with English translation).
Korean Office Action (Application No. 10-2020-7015375) dated Jan. 24, 2022 (with English translation).
Japanese Office Action (with English translation) dated Jun. 7, 2022 (Application No. 2019-222379).
Japanese Office Action (Application No. 2021-122825) dated Aug. 2, 2022 (with English translation) (6 pages).

* cited by examiner

OPTICAL STRUCTURE COMPRISING A CONCAVE-AND-CONVEX-SHAPED INTERFACE HAVING A FLAT PORTION BETWEEN A HIGH REFRACTIVE-INDEX LAYER AND A LOW REFRACTIVE-INDEX LAYER AND DISPLAY DEVICE

CROSS REFERENCE TO RELATED APPLICATIONS

This application is a continuation of U.S. application Ser. No. 17/194,683, filed Mar. 8, 2021, which is a continuation of U.S. application Ser. No. 16/891,424, filed Jun. 3, 2020, now U.S. Pat. No. 11,016,342, issued May 25, 2021, which is a continuation of U.S. application Ser. No. 16/605,642, filed Oct. 16, 2019, now U.S. Pat. No. 10,747,054, issued Aug. 18, 2020, which in turn is the National Stage entry of International Application No. PCT/JP2018/016074, filed Apr. 19, 2018, which designated the United States, the entireties of which are incorporated herein by reference.

FIELD OF THE INVENTION

The present invention relates to an optical structure that exerts an optical effect on light emerged from a display surface of a display device. In addition, the present invention relates to a display device comprising the optical structure.

BACKGROUND OF THE INVENTION

A liquid-crystal display device as one example of display devices is used in various fields. A liquid crystal panel of the liquid-crystal display device is roughly classified into a TN (Twisted Nematic) type, a VA (Vertical Alignment) type and an IPS (In-Plane Switching) type.

When a voltage is off, a liquid crystal panel of a TN type transmits light, with liquid crystal molecules being oriented in a direction parallel to a display surface. By gradually increasing a voltage, the liquid crystal molecules are allowed to gradually stand up toward being along a normal direction of the display surface, a light transmittance gradually decreases. When a voltage is off, a liquid crystal pane of a VA type blocks light, with liquid crystal molecules being oriented along a normal direction of a display surface. By gradually increasing a voltage, the liquid crystal molecules are gradually inclined toward being along the display surface, a light transmittance gradually increases. A liquid crystal panel of an IPS type adjusts a light transmittance by rotating liquid crystal molecules oriented along a display surface in accordance with application of voltage.

In a liquid crystal panel, it is generally important to control an amount and/or range of light that travels toward a front side, in order to suitably ensure a brightness, a contrast ratio and color reproducibility in a front view. On the other hand, to control light which travels in a direction inclined to a normal direction of a liquid panel is relatively complicated. Thus, in order to ensure a wide viewing angle and/or to sufficiently control a brightness, dispersions of a contrast ratio and color reproducibility in the viewing angle, a structure of the liquid panel may be complicated to undesirably increase cost. In order to deal with such a problem, Patent Documents 1 to 6, for example, respectively disclose an optical member provided on a display surface of a liquid crystal panel in order to widen a viewing angle due to a diffusion effect or the like. Such a member can simply improve a viewing angle.

Patent Document 1: JPH7-43704A
Patent Document 2: JP3272833B
Patent Document 3: JP3621959B
Patent Document 4: JP2016-126350A
Patent Document 5: JP2012-145944A
Patent Document 6: JP2011-118393A

SUMMARY OF THE INVENTION

In a liquid crystal panel employing the VA type among the above types, when a voltage to liquid crystal molecules is off, a black color is displayed. By bringing the black color very close to an actual black color, a contrast ratio in a front view can be significantly gained. On the other hand, when a display surface of the liquid crystal panel is observed from a direction inclined to a normal direction of the display surface, there is relatively a large amount of light leaked from a pixel that is in a black color in a front view, so that a contrast ratio may be seriously lowered as compared with the contrast ratio in a front view. As a result, each contrast ratio in a viewing angle may largely vary. When an optical member for merely diffusing light is provided on such a liquid crystal panel, the contrast ratio in a front view may be undesirably lowered, which impairs an advantage of a VA type. Similarly, the optical member for merely diffusing light may also undesirably lower a brightness in a front view.

In addition, when a display surface of a VA-type liquid crystal panel is observed from a direction inclined to a normal direction of the display surface, an emission spectrum shape with respect to the inclined direction changes so that color reproducibility lowers. The present inventors have found that this is because the emission spectrum shape change of displaying blue with respect to an observation angle is intensive (as compared with displaying red and displaying green). To be specific, since "an intensity of a wavelength component corresponding to green" changes to increase as compared with "an intensity of a wavelength component corresponding to blue", a displayed color tends to turn yellow. It is convenient that this problem can be solved by the aforementioned optical member. However, it cannot be said that the aforementioned prior art can effectively suppress a color change depending on an observation angle.

In addition, an optical member as disclosed in Patent Documents 1 to 6 is sometimes provided, outside a layer that exerts an optical effect on incident light, with a surface member that forms an outermost surface on a light emergent side. Such a surface member can function as a protective layer, but may lower a brightness of light emerged from the outermost surface to seriously lower a brightness on a high angle side. Thus, such a surface member may undesirably disturb an improved viewing angle due to the layer that exerts an optical effect.

The present invention has been made in view of the above circumstances. The object of the present invention is to provide an optical structure capable of simply suppressing color change dispersion in a viewing angle while maintaining good display quality of a display device in a front view, and a display device comprising such an optical structure. In addition, the object of the present invention is to provide an optical structure capable of simply suppressing color change dispersion in a viewing angle while maintaining good display quality of a display device in a front view, and further capable of suppressing that a brightness in a viewing angle is undesirably lowered by a surface member that forms an outermost surface on a light emergent side, and a display device comprising such an optical structure.

An optical structure according to the present invention is an optical structure to be disposed on a display surface of a display device, comprising: a high refractive-index layer; and a low refractive-index layer laminated on the high refractive-index layer, and having a refractive index lower than that of the high refractive-index layer; wherein: an interface between the high refractive-index layer and the low refractive-index layer has a concave-and-convex shape; each of a concavity and a convexity in the concave-and-convex shape has a flat portion extending in a surface direction of the high refractive-index layer and the low refractive-index layer; a side surface of the concave-and-convex shape, which extends between the flat portion of the concavity and the flat portion of the convexity, is a curved surface or a folded surface that is convex to the low refractive-index layer; the low refractive-index layer is configured to be disposed to face the display surface of the display device; and a difference between a maximum angle and a minimum angle, which are defined between the side surface of the concave-and-convex shape and a normal direction of the high refractive-index layer and the low refractive-index layer, is not less than 3 degrees and not more than 60 degrees.

In addition, an optical structure according to the present invention is an optical structure to be disposed on a display surface of a display device, comprising: a high refractive-index layer; and a low refractive-index layer laminated on the high refractive-index layer, and having a refractive index lower than that of the high refractive-index layer; wherein: an interface between the high refractive-index layer and the low refractive-index layer has a concave-and-convex shape; each of a concavity and a convexity in the concave-and-convex shape has a flat portion extending in a surface direction of the high refractive-index layer and the low refractive-index layer; a side surface of the concave-and-convex shape, which extends between the flat portion of the concavity and the flat portion of the convexity, is a curved surface or a folded surface that is convex to the low refractive-index layer; the low refractive-index layer is configured to be disposed to face the display surface of the display device; and a ratio of a total length of the flat portions with respect to a length of one cycle of the concavity and the convexity of the concave-and-convex shape is not less than 0.50 and less than 1.00.

In addition, an optical structure according to the present invention is an optical structure to be disposed on a display surface of a display device, comprising: a high refractive-index layer; and a low refractive-index layer laminated on the high refractive-index layer, and having a refractive index lower than that of the high refractive-index layer; wherein: an interface between the high refractive-index layer and the low refractive-index layer has a concave-and-convex shape; each of a concavity and a convexity in the concave-and-convex shape has a flat portion extending in a surface direction of the high refractive-index layer and the low refractive-index layer; a side surface of the concave-and-convex shape, which extends between the flat portion of the concavity and the flat portion of the convexity, is a curved surface or a folded surface that is convex to the low refractive-index layer; the low refractive-index layer is configured to be disposed to face the display surface of the display device; and an average inclination angle of the side surface of the concave-and-convex shape, which is defined between a straight line connecting both end points of the side surface of the concave-and-convex shape and a normal direction of the high refractive-index layer and the low refractive-index layer, is not less than 9 degrees and not more than 18 degrees.

In addition, an optical structure according to the present invention is an optical structure to be disposed on a display surface of a display device, comprising: a high refractive-index layer; a low refractive-index layer laminated on the high refractive-index layer, and having a refractive index lower than that of the high refractive-index layer; and a surface member disposed on the high refractive-index layer on a side opposite to the low refractive-index layer; wherein: an interface between the high refractive-index layer and the low refractive-index layer has a concave-and-convex shape; each of a concavity and a convexity in the concave-and-convex shape has a flat portion extending in a surface direction of the high refractive-index layer and the low refractive-index layer; two of side surfaces of the concave-and-convex shape, which are adjacent to each other and extend between the flat portion of the concavity and the flat portion of the convexity, form a tapered shape tapering toward a direction in which the concavity is recessed or a direction in which the convexity projects; the low refractive-index layer is configured to be disposed to face the display surface of the display device; the surface member forms an outermost surface on a side opposite to the display surface of the display device; and a refractive index of the surface member is not more than 1.40.

In the optical structure according to the present invention, the side surface of the concave-and-convex shape may be a curved surface or a folded surface that is convex to the low refractive-index layer.

In addition, in the optical structure according to the present invention, a difference between a maximum angle and a minimum angle, which are defined between the side surface of the concave-and-convex shape and a normal direction of the high refractive-index layer and the low refractive-index layer, is preferably not less than 3 degrees and not more than 60 degrees.

In addition, in the optical structure according to the present invention, a ratio of a total length of the flat portions with respect to a length of one cycle of the concavity and the convexity of the concave-and-convex shape is preferably not less than 0.50 and less than 1.00.

In addition, in the optical structure according to the present invention, an average inclination angle of the side surface of the concave-and-convex shape, which is defined by a straight line connecting both end points of the side surface of the concave-and-convex shape, and a normal direction of the high refractive-index layer and the low refractive-index layer, is preferably not less than 9 degrees and not more than 18 degrees.

In addition, a display device according to the present invention is a display device in which any of the above-mentioned optical structure is disposed on a display surface.

The display device according to the present invention may comprise: a liquid crystal panel having the display surface and a back surface opposed to the display surface; and a surface light source device disposed to face a back surface of the liquid crystal panel.

The liquid crystal panel may be a VA type liquid crystal panel which is configured such that, when a voltage to liquid crystal molecules is off or at a minimum value, the liquid crystal molecules are oriented along a normal direction of the display surface so that light from the surface light source device is blocked, and such that, when a voltage to the liquid crystal molecules is gradually increased, the liquid crystal molecules are inclined little by little to being along the display surface so that a transmittance of the light from the surface light source device is gradually increased.

The present invention can simply suppress color change dispersion in a viewing angle, while maintaining good display quality of the display device in a front view.

DETAILED DESCRIPTION OF THE INVENTION

One embodiment of the present invention will be described herebelow with reference to the drawings.

In this specification, the terms "sheet", "film", "plate" and "layer" are not differentiated from one another, based only on the difference of terms. Thus, for example, a "sheet" is a concept including a member that can be referred to as film, plate or layer. In addition, in this specification the term "sheet plane (plate plane, film plane)" means a plane corresponding to a plane direction (surface direction) of a sheet-like member when it is seen as a target as a whole in general. Further, in this specification, a normal direction of a sheet-like member is a direction normal to a sheet plane of a sheet-like member as a target.

Figure 1:
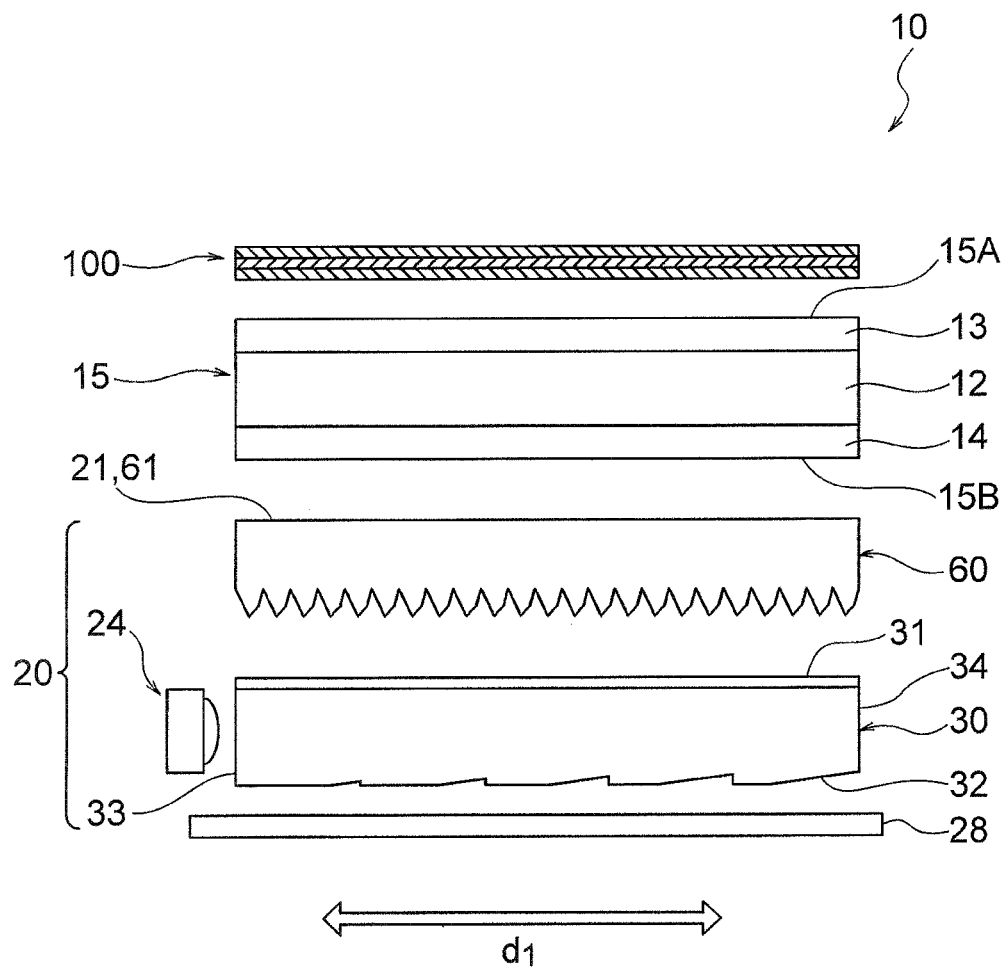
FIG. 1 is a schematic sectional view of a display device comprising an optical structure according to one embodiment of the present invention.
Figure 2:
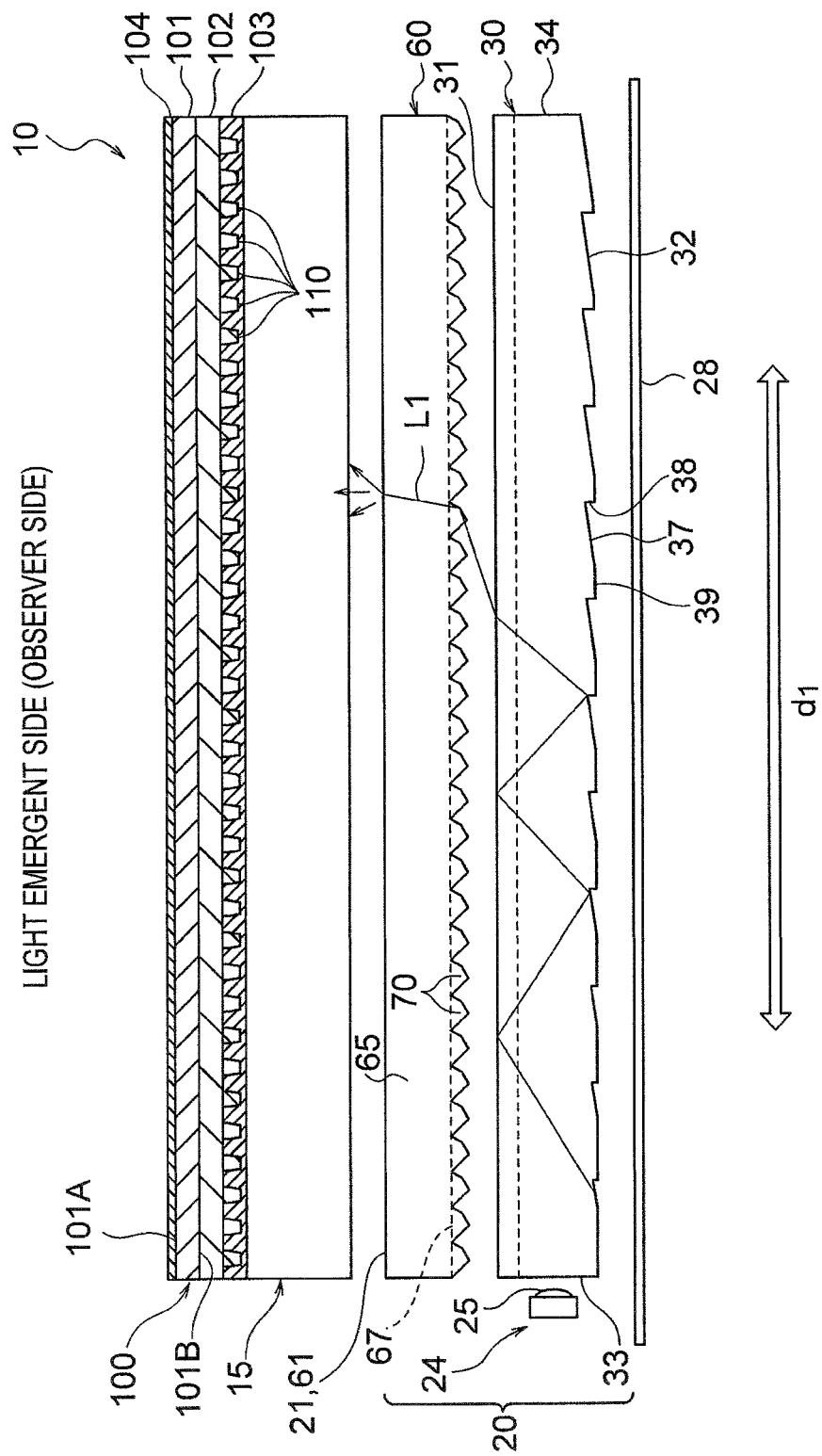
FIG. 2 is a schematic sectional view of the display device for explaining a behavior of light in the display device according to this embodiment.
Figure 3:
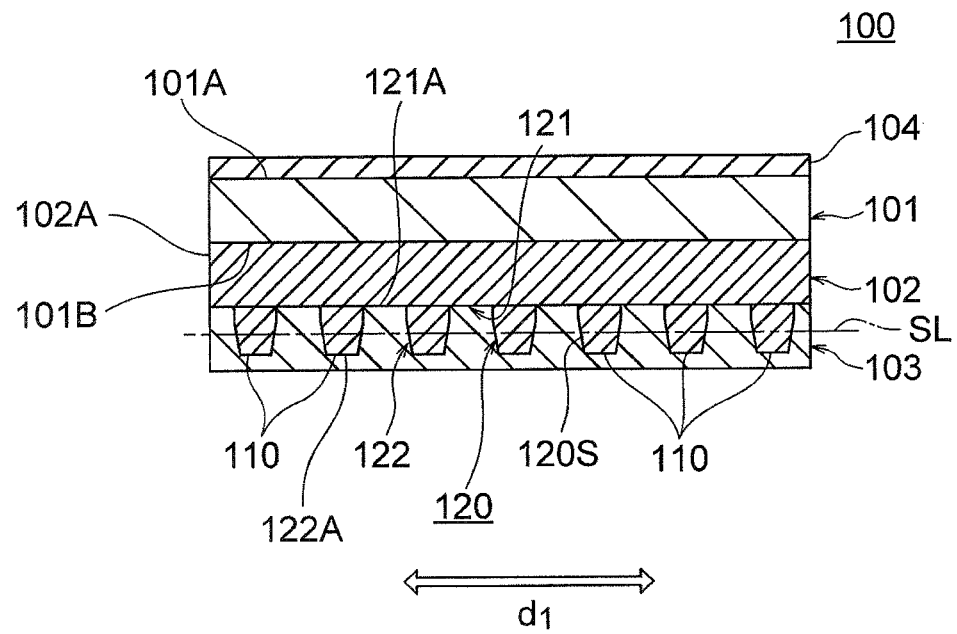
FIG. 3 is an enlarged sectional view of the optical structure according to this embodiment.
Figure 4:
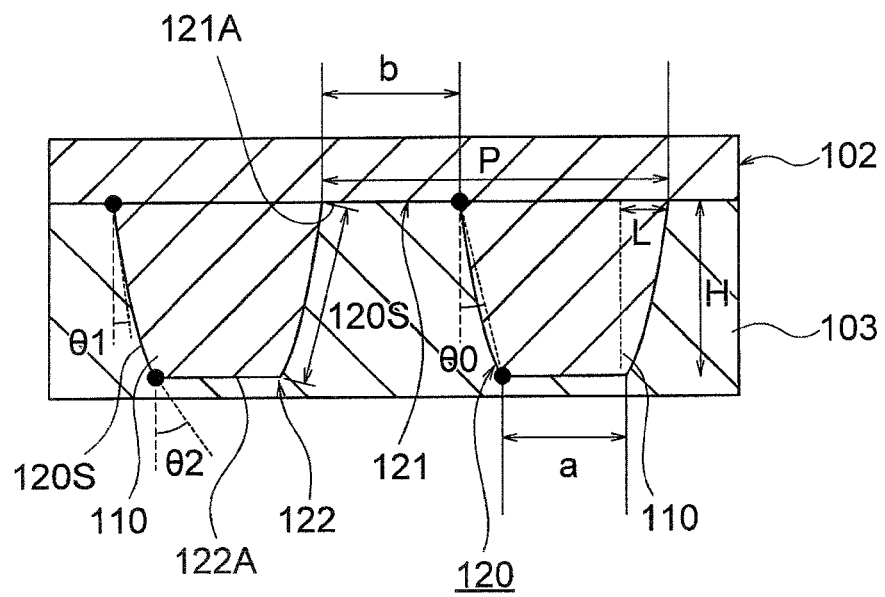
FIG. 4 is an enlarged view of a concave-and-convex shape formed on an interface between a high refractive-index layer and a low refractive-index layer of the optical structure according to this embodiment.

A basic structure of a display device 10 comprising an optical structure 100 according to one embodiment of the present invention is firstly described with reference to FIGS. 1 to 4. FIG. 1 is a schematic sectional view of the display device 10 comprising the optical structure 100. FIG. 2 is a sematic sectional view of the display device 10 for explaining a behavior of light in the display device 10. FIG. 3 is an enlarged sectional view of the optical structure 100. FIG. 4 is an enlarged view of a concave-and-convex shape formed on an interface between a high refractive-index layer and a low refractive-index layer of the optical structure 100. In the above respective sectional views, hatching is sometimes omitted for the convenience of explanation. In addition, FIGS. 1 to 4 show sectional views of a plane including a below-described first direction $d_1$, and a common normal direction of a liquid crystal panel 15 of the display device 10 and a sheet-like base member 101 of the optical structure 100. In this embodiment, the first direction $d_1$ is a direction parallel to a direction in which a light source 24 of a surface light source device 20 of an edge-light type in the display device 10 emits light to a light guide plate 30, as described below.

(Display Device)

An overall structure of the display device 10 is firstly described. As shown in FIG. 1, the display device 10 according to this embodiment comprises a liquid crystal panel 15, a surface light source device 20 disposed to face a back surface 15B of the liquid crystal panel 15 so as to illuminate the liquid crystal panel 15 in a surface shape from the side of the back surface 15B, and a sheet-like optical structure 100 disposed on a display surface 15A of the liquid crystal panel 15. The liquid crystal panel 15 has the display surface 15A that displays a static image or a dynamic image, and the back surface 15B opposed to the display surface 15A. In the display device 10, the liquid crystal panel 15 functions as a shutter that controls light transmission or block for each area that forms a pixel (sub-pixel). An image is displayed on the display surface 15A by driving the liquid crystal panel 15.

The illustrated liquid crystal 15 has an upper polarizing plate 13 disposed on the light emergent side, a lower polarizing plate 14 disposed on the light incident side, and a liquid crystal layer 12 disposed between the upper polarizing plate 13 and the lower polarizing plate 14. The polarizing plates 14 and 13 each have a function for dividing incident light into two polarization components (e.g., P wave and S wave) orthogonal to each other, and allowing a linear polarization component (e.g., P wave), which oscillates in one direction (direction parallel to transmission axis), to transmit therethrough, while absorbing a linear polarization component (e.g., S wave), which oscillates in the other direction (direction parallel to absorption axis) orthogonal to the one direction.

In the liquid crystal layer 12, a voltage can be applied to each area that forms one pixel. Depending on whether a voltage is applied or not, an orientation direction of liquid crystal molecules in the liquid crystal layer 12 changes. For example, when a polarization component in a predetermined direction, which has transmitted through the lower polarization plate 14 disposed on the light incident side, transmits through the liquid crystal layer 12 to which no voltage is applied, the polarization component rotates a polarization direction thereof at 90°. On the other hand, when such a polarization component transmits through the liquid crystal layer 12 to which a voltage is applied, the polarization component maintains its polarization direction. In this case, by applying or not applying a voltage to the liquid crystal layer 12, the polarization component, which has transmitted through the lower polarization plate 14 and oscillates in a predetermined direction, can be controlled to further transmit through the upper polarization plate 13 disposed on the light emergent side of the lower polarization plate 14, or to be absorbed in the upper polarization plate 13 so as to be blocked. In this manner, in the liquid crystal panel 15, transmission or block of light from the surface light source device 20 can be controlled for each area that forms a pixel.

In this embodiment, the liquid crystal panel 15 is a VA (Vertical Alignment) type liquid crystal panel. Thus, the liquid crystal panel 15 is configured such that, when a voltage to the liquid crystal molecules in the liquid crystal layer 12 is off or at a minimum value, the liquid crystal molecules are oriented along a normal direction of the display surface 15A so that light from the surface light source device 20 is blocked, and such that, when a voltage to the liquid crystal molecules is gradually increased, the liquid crystal molecules are inclined little by little to being along the display surface 15A so that a transmittance of the light from the surface light source device 20 is gradually increased. However, the liquid crystal panel 15 is not limited to the VA type, and may be of a TN (twisted Nematic) type liquid crystal panel or an IPS (In-Plane Switching) type liquid crystal panel. Details of the liquid crystal panel 15 are described in various known documents (e.g., "Dictionary of Flat Panel Display (supervised by UCHIDA Tatsuo, UCHIIKE Heiji)" published in 2001 by Kogyo Chosakai Publishing Co., Ltd.), and further detailed description thereof is omitted.

Next, the surface light source device 20 is described. The surface light source device 20 has a light-emitting surface 21 that emits light in a planar shape. In this embodiment, the surface light source device 20 is used as a device that illuminates the liquid crystal panel 15 from the side of the back surface 15B. As shown in FIG. 1, the surface light source device 20 is, e.g., an edge light type surface light source device, and has a light guide plate 30, a light source 24 disposed laterally on one side (left side in FIG. 1) of the light guide plate 30, an optical sheet (prism sheet) 60 disposed to face the light guide plate 30, and a reflection sheet 28 disposed to face the light guide plate 30. In the illustrated example, the optical sheet 60 directly faces the liquid crystal panel 15. A light emergent surface 61 of the optical sheet 60 defines the light-emitting surface 21 of the surface light source device 20.

In the illustrated example, similarly to the display surface 15A of the liquid crystal panel 15 and the light-emitting surface 21 of the surface light source device 20, the light emergent surface 31 of the light guide plate 30 has a quadrangular shape in a plan view (shape seen from above). As a result, the light guide plate 30 is formed generally as a parallelepiped member in which thick-wise sides having a pair of main surfaces (light emergent surface 31 and back surface 32) are relatively smaller than other sides. Side surfaces defined between the pair of two main surfaces include four surfaces. Similarly, the optical sheet 60 and the reflection sheet 28 are each formed generally as a parallelepiped member in which thick-wise sides are relatively smaller than other sides.

As shown in FIGS. 1 and 2, the light guide plate 30 has the aforementioned light emergent surface 31 formed by one main surface on the side of the liquid crystal panel 15, a back surface 32 formed by the other main surface opposed to the light emergent surface 31, and side surfaces extending between the light emergent surface 31 and the back surface 32. One side surface of two surfaces of the side surfaces, which is opposed to the first direction $d_1$, defines a light incident surface 33. As shown in FIGS. 1 and 2, the light source 24 is disposed to face the light incident surface 33. As shown in FIG. 2, light incident from the light incident surface 33 into the light guide plate 30 is guided inside the light guide plate 30 generally along the first direction (light guide direction) $d_1$ toward an opposite surface 34, which is opposed to the light incident surface 33 along the first direction (light guide direction) $d_1$. The display device 10 according to this embodiment is assumed to be positioned such that the first direction $d_1$ is along the horizontal direction, i.e., the right and left direction. In this case, light from the light source 24 is guided in the light and left direction. However, such a positioning is not particularly limited, and the display may be positioned otherwise. In this embodiment, although the surface light source device 20 is of an edge light type, the surface light source device 20 may be of another type such as a direct type or a back-illuminated type.

The light guide plate 30 is described in more detail. In this embodiment, the back surface 32 of the light guide plate 30 is formed as a concave and convex surface. To be specific, as shown in FIG. 2, the back surface 32 has an inclined surface 37, a step surface 38 extending in the normal direction of the light guide plate 30, and a connection surface 39 extending in a plate plane direction of the light guide plate 30. Light guide in the light guide plate 30 is performed by a total reflection effect by the pair of main surfaces 31, 32 of the light guide plate 30. On the other hand, the inclined surface 37 is inclined with respect to the plate plane of the light guide plate 30 so as to come close to the light emergent surface 31 from the light incident surface 33 toward the opposite surface 34. Thus, an incident angle of light having been reflected by the inclined surface 37 into the pair of main surfaces 31, 32 is smaller. When the incident angle on the pair of main surfaces 31, 32 becomes less than a total reflection critical angle because of the reflection by the inclined surface 37, as shown by L1 of FIG. 2, the light emerges from the light guide plate 30. Namely, the inclined surface 37 functions as an element for taking out light from the light guide plate 30. The light guide plate 30 is not limited to the type in this embodiment, and may be of another type such as a dot pattern type.

The light source 24 may be formed of a fluorescent lamp such as a linear cold cathode tube, a dot-like LED (light-emitting diode), a filament lamp and the like. The light source 24 in this embodiment is formed of a large number of dot-like light-emitting elements, specifically, a large number of light-emitting diodes (LED), which are arranged side by side along the longitudinal direction of the light incident surface 33.

The reflection sheet 28 is a member disposed to face the back surface 32 of the light guide plate 30. The reflection sheet 28 is a member for reflecting light leaked from the back surface 32 of the light guide plate 30 and for allowing the light to be again incident on the light guide plate 30. The reflection sheet 28 is formed of a white diffusion reflection sheet, a sheet made of a material such as a metal having a high reflectance, a sheet including, as a surface layer, a membrane made of a material having a high reflectance (e.g., metal membrane, dielectric multilayer membrane). Reflection by the reflection sheet 28 may be either specular reflection (mirror reflection) or diffuse reflection. When the reflection by the reflection sheet 28 is diffuse reflection, the diffuse reflection may be either isotropic diffuse reflection or anisotropic diffuse reflection.

The optical sheet 60 is a member having a function for changing a travelling direction of transmission light. As shown in FIG. 2, the optical sheet 60 according to this example has a body part 65 formed like a plate, and a plurality of unit prisms (unit shaped elements, unit optical element, unit lenses) 70 formed on a light incident side surface 67 of the body part 65. The body part 65 is formed as a flat plate-like member having a pair of parallel main surfaces. In the illustrated example, the unit prisms 70 are arranged side by side on the light incident side surface 67 of the body part 65. Each unit prism 70 has a columnar shape, and extends in a direction intersecting its arrangement direction. Although one optical sheet 60 is provided on the light guide plate 30 in this embodiment, a plurality of optical sheets may be provided on the light guide plate 30. In this case, orientations of grooves of prisms of the respective optical sheets may differ from one another.

Since the surface light source device 20 as described above comprises the optical sheet 60, the surface light source device 20 converts a traveling direction and a polarization state of light from the light guide plate 30 into desired ones, and allows the light to be incident on the liquid crystal panel 15. As described above, transmission or block of the light incident on the liquid crystal panel 15 is controlled in the liquid crystal layer 12 for each area that forms a pixel, depending on whether a voltage is applied or not. Thus, an image is displayed on the display surface 15A of the liquid crystal panel 15.

(Optical Structure)

Next, the optical structure 100 is described in detail with reference to FIGS. 2 to 4. As shown in FIGS. 2 and 3, the optical structure 100 according to this embodiment comprises: a sheet-like or film-like base member 101 having an light emergent surface 101A and a back surface 101B opposed to the light emergent surface 101A; a sheet-like or film-like high refractive-index layer 102 extending along the base member 101; a sheet-like or film-like low refractive-index layer 103 which is provided on a surface of the high refractive-index layer 102, which surface is opposed to the side of the base member 101, and extends along the base member 101, the low refractive-index layer 103 having a refractive index lower than that of the high refractive-index layer 102; and a sheet-like or film-like antireflection layer 104 which is disposed on a side of the high refractive-index layer 102, which side is opposed to the side of the low refractive-index layer 103. In this example, the antireflection film 104 is provided on the light emergent surface 101A of the base member 101. The antireflection layer 104 in this embodiment is a member corresponding to a surface member that forms an outermost surface of the light emergent side.

The base member 101 is a transparent base member made of resin or glass and having a light transmission property. A material thereof may be, for example, polyethylene terephthalate, polyolefin, polycarbonate, polyacrylate, polyamide, glass, triacetyl cellulose, and the like. The optical structure 100 is disposed such that the low refractive-index layer 103 faces the display surface 15A of the display device 10. In the illustrated example, the low refractive-index layer 103 is in directly contact with the display device 10, i.e., the display surface 15A. In addition, the antireflection layer 104 forms an outermost surface on the side opposed to the side of the display surface 15A of the display device 10. The antireflection layer 104 is provided for suppressing surface reflection of outside light that is incident on the optical structure 100. Thus, it can be prevented that visibility of an image displayed on the display device 10 is impaired by surface reflection of outside light.

A refractive index of the antireflection layer 104 is not more than 1.40. More specifically, it is 1.35. A general refractive index of a surface member, such as an antireflection layer, is greater than about 1.45 and is not more than about 1.50. A member having such a refraction index is available relatively at a low price, which reduces cost. However, when a surface member, which has a refractive index greater than about 1.45 and not more than about 1.50, is used, a critical angle, at which light that is going to emerge from the display device starts to totally reflect at an interface between the surface member and air, is relatively small. Thus, an amount of light that can be taken out decreases. As a result, when an image on the display device is observed, a brightness of the image may lower, in particular, a brightness on a high angle side may significantly lower. In contrast thereto, in this embodiment, a refractive index of the antireflection layer 104 is set to be not more than 1.40, so as to raise a critical angle at which light starts to totally reflect at an interface between the antireflection layer 104 and air. Thus, an amount of light that can be taken out increases as compared with a case of a general surface member. Accordingly, undesirable lowering of a brightness in a viewing angle is suppressed.

The present inventors have conducted intensive studies and have found that, in order both to prevent surface reflection of outside light and to take out sufficient light from the display device, a refractive index of the antireflection layer 104 serving as a surface member is preferably not less than 1.28 and not more than 1.40, and particularly preferably not less than 1.30 and not more than 1.36 based on experiments and simulations. In this embodiment, the antireflection layer 104 as a surface member has a function for suppressing surface reflection of outside light, but the surface member may not have such a function. In addition, in the optical structure 100, a color change suppression effect in a viewing angle is obtained by an optical effect exerted by the high refractive-index layer 102 and the low refractive-index layer 103 on light, which is described below. However, such an effect can be obtained without the antireflection layer 104.

As shown in FIG. 3, in this embodiment, the high refractive-index layer 102 has a plurality of lens parts 110 on a surface opposed to the base member 101. The lens parts 110 are formed to be convex to the low refractive-index layer 103 along the normal direction of the high refractive-index layer 102. Namely, the high refractive-index layer 102 integrally has a film-like layer body 102A having a front surface facing the base member 101 and a back surface opposed to the front surface to face the low refractive-index layer 103, and the plurality of lens parts 110 arranged side by side on the back surface of the layer body 102A. On the other hand, the low refractive-index layer 103 is laminated on the high refractive-index layer 102 so as to cover the lens parts 110 and to fill spaces between the lens parts 110. Thus, in this embodiment, an interface between the high refractive-index layer 102 and the low refractive-index layer 103 has a concave-and-convex shape 120.

In the concave-and-convex shape 120, one concavity 121 and one convexity 122 form one cycle shape. The concave-and-convex shape 120 is formed by repeatedly forming the one cycle shape. A portion which is recessed to the side of the high refractive-index layer 102 with respect to a reference line SL extending in a surface direction that passes a midpoint between a bottom of the concavity 121 and a top of the convexity 122, corresponds to the concavity 121. A portion which projects to the side of the low refractive-index layer 103 with respect to the reference line SL corresponds to the convexity 122. The concavities 121 and the convexities 122 are respectively arranged in the first direction $d_1$, and linearly extend in a direction not parallel to the first direction $d_1$, for example, in a direction orthogonal to the first direction $d_1$. The respective concavities 121 and the convexities 122 in this example linearly extend in a direction orthogonal to the first direction $d_1$.

As shown in FIG. 3, each of the concavity 121 and the convexity 122 in this embodiment has a flat portion 121A, 122A extending along a surface direction of the high refractive-index layer 102 and the low refractive-index layer 103. In detail, the bottom of the concavity 121 defines the flat portion 121A, and the top of the convexity 122 defines the flat portion 122A. In addition, a side surface 120S of the concave-and-convex shape 120, which extends between the flat portion 121A of the concavity 121 and the flat portion 122A of the convexity 122, is a curved surface that is convex to the low refractive-index layer 103. The side surface 120S is formed so as not to extend, in the surface direction, beyond a straight line extended from an end point of the flat portion 121A, to which the side surface 120S is connected, along the normal direction. Thus, die cutting of the high refractive-index layer 102 having the lens parts 110 forming the side surfaces 120S is enabled. Although the side surface 120S is a curved surface in this embodiment, the side surface 120S may be a folded surface (polygonal shape) that is convex to the low refractive-index layer 103. In addition, the side surface 120S formed as a curved surface may be formed along an arc of a precise circle, or may be formed along an arc of an ellipse. The concave-and-convex shape 120 as described above is provided for improving display quality of an image displayed on the display surface 15A, by exerting an optical effect, such as total reflection, refraction, transmission, etc., on light for displaying an image, which is emerged from the display surface 15A. In this embodiment, since the side surface 120S is a curved surface convex to the low refractive-index layer 103, two side surfaces 120S adjacent to each other form a tapered shape tapering toward in a direction in which the concavity 121 is recessed or a direction in which the convexity 122 projects. In other words, the side surfaces 120S, which are adjacent to each other with the flat portion 121A of the concavity 121 being interposed therebetween, form a tapered shape tapering from the low refractive-index layer 103 toward the high refractive-index layer 102. In addition, the side surfaces 120S, which are adjacent to each other with the flat portion 122A of the convexity 122 being interposed therebetween, form a tapered shape tapering from the high refractive-index layer 102 toward the low refractive-index layer 103. With such a shape, an optical effect for improving display quality of an image displayed on the display surface 15A is generated. When the side surface 120S is a curved shape or a polygonal shape convex to the low refractive-index layer 103 as in this embodiment, color change in a viewing angle can be particularly effectively suppressed.

In addition, in this embodiment, the high refractive-index layer 102 and the low refractive-index layer 103 are selected such that a difference between a refractive index of the high refractive-index layer 102 and a refractive index of the low refractive-index layer 103 is within a range of not less than 0.05 and not more than 0.25. In addition, the high refractive-index layer 102 is disposed to direct front-side of the display device 10, and the low refractive-index layer 103 is disposed to face the display surface 15A of the liquid crystal panel 15. In the illustrated example, the low refractive-index layer 103 is an adhesive layer. As shown in FIG. 2, the optical structure 100 is joined to the display surface 15A of the liquid crystal panel 15 by means of the low refractive-index layer 103. These high refractive-index layer 102 and the low refractive-index layer 103 are also members having a light transmission property, and their material is not particularly limited.

FIG. 4 is an enlarged view showing the concave-and-convex shape 120. Herebelow, the concave-and-convex shape 120 is described in more detail with reference to FIG. 4. A symbol θ1 shows a minimum angle that is defined between the side surface 120S of the concave-and-convex shape 120 and the normal direction of the high refractive-index layer 102 and the low refractive-index layer 103. A symbol θ2 shows a maximum angle that is defined between the side surface 120S of the concave-and-convex shape 120 and the normal direction of the high refractive-index layer 102 and the low refractive-index layer 103. In more detail, the minimum angle θ1 is an angle that is defined between a tangent passing through an end point of the side surface 120s of the concave-and-convex shape 120 on the side of the concavity 121 and the normal direction of the interface between the high refractive-index layer 102 and the low refractive-index layer 103. The maximum angle θ2 is an angle that is defined between a tangent passing through an end point of the side surface 120S on the side of the convexity 122 and the normal direction of the interface between the high refractive-index layer 102 and the low refractive-index layer 103. When the side surface 120S is a folded surface, the minimum angle θ1 is an angle that is defined between a straight line passing through an element surface including the end point of the side surface 120S on the side of the concavity 121 and the normal direction of the interface between the high refractive-index layer 102 and the low refractive-index layer 103, and the maximum angle θ2 is an angle that is defined between a straight line passing through an element surface including the end point of the side surface 120S on the side of the convexity 122 and the normal direction of the interface between the high refractive-index layer 102 and the low refractive-index layer 103. In addition, a symbol θ0 shows an "average inclination angle" of the side surface 120S, which is defined between a straight line connecting both end points of the side surface 120S of the concave and the convex shape 120 and the normal direction of the high refractive-index layer 102 and the low refractive-index layer 103. A symbol P shows a pitch that is an interval of one cycle composed of one concavity 121 and one convexity 122 of the concave-and-convex shape 120. A symbol H shows a height of the concave-and-convex shape 120 from the concavity 121 up to the convexity 122 along the normal direction. A symbol L shows a distance between both the end points of the side surface 120S in the surface direction.

An "inclination angle range α" is defined by a difference between the maximum angle θ2 and the minimum angle θ1. The larger the inclination angle range α is, the larger a curvature of the side surface 120S is. The present inventors have conducted intensive studies and have found that this inclination angle range α is preferably not less than 3 degrees and not more than 60 degrees. In addition, the present inventors have found that the aforementioned "average inclination angle θ0" is preferably not less than 9 degrees and not more than 18 degrees. Further, the present inventors have hound that, when a ratio of a total length of the flat portions 121A, 122A with respect to a length of one cycle of the concavity 121 and the convexity 122 of the concave-and-convex shape 120 is represented as β, β=(a+b)/P is particularly preferably not less than 0.60 and not more than 0.90, as shown in FIG. 4. The above "a" is a width (length) of the flat portion 122A of the convexity 122, and the above "b" is a width (length) of the flat portion 121A of the concavity 121. Moreover, the present inventors have found that a particularly preferred range of the inclination angle range α varies depending on the ratio β. For example, as described later, when the ratio β is 0.80, it has been found that the inclination angle range α is particularly preferably not less than 9 degrees and not more than 16 degrees. However, when the ratio β varies, the particularly preferred range of the inclination angle range α also varies.

When the concave-and-convex shape 120 is formed to simultaneously satisfy the aforementioned three kinds of dimensional conditions, color change in a viewing angle can be significantly effectively suppressed, while maintaining good display quality of the display device 10 in a front view. However, even when the above dimensional conditions is only partially satisfied, the concave-and-convex shape 120 can effectively suppress color change in a viewing angle.

Next, an example describing how to obtain that the aforementioned inclination angle range α, the average inclination angle θ0 and the ratio β are in particularly preferred ranges is described.

(Relationship Between Inclination Angle Range (Curvature) of Side Surface of Concave-and-Convex Shape and Color Change)

Figure 5:
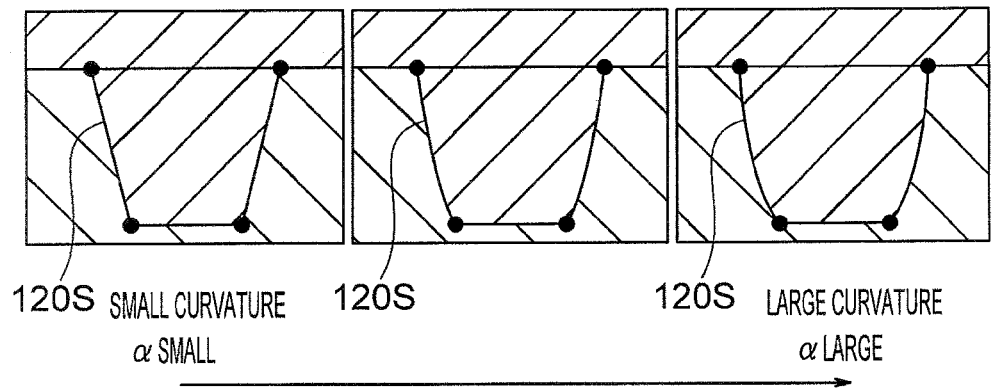
FIG. 5 is a view showing a plurality of side surfaces of concave-and-convex shapes of the optical structure, the side surfaces having curvatures different from one another.
Figure 6:
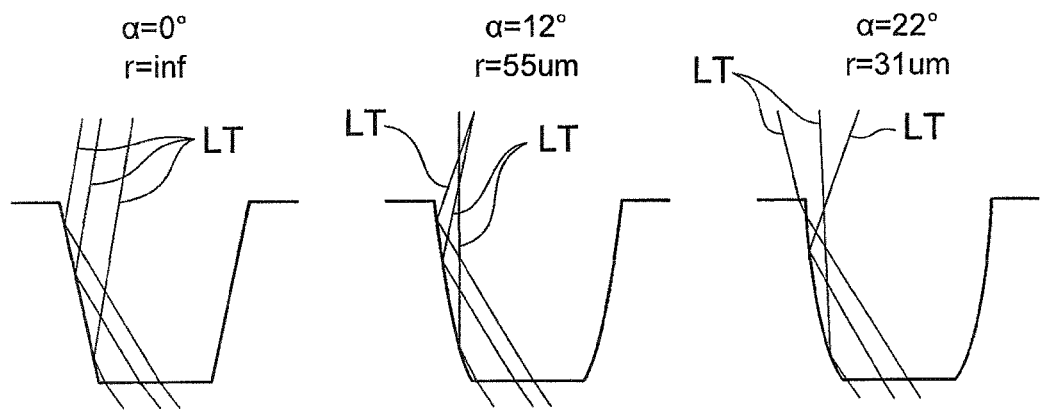
FIG. 6 is a view showing behaviors of light reflected by the plurality of side surfaces of the concave-and-convex shapes, the side surfaces having curvatures different from one another.

Firstly, by way of example, the fact that, when the ratio β is 0.80, the particularly preferred range of the inclination angle range α is not less that 9 degrees and not more than 16 degrees is described. FIG. 5 shows a plurality of (three) side surfaces 120S of the concave-and-convex shape 120, which have curvatures different from one another. The inclination angle range α of the side surface 120S increases from the left to the right in FIG. 5. Namely, the curvature also increases. When the curvature of the side surface 120S differs, a behavior of light which enters from the flat portion 122A of the convexity 122 so as to be totally reflected by the side surface 120S varies, as shown by a light trajectory LT in FIG. 6. When the side surface 120S is a curved surface, color change in a viewing angle can be particularly effectively suppressed. Here, note that, in FIG. 6, although the left side surface 120S has the inclination angle range α of 0 degrees so that its radius of curvature is infinite (Inf), the side surface 120S having the inclination angle range α of 0 degrees is not included in a "curved surface" concept, such a side surface 120S is shown for the sake of convenience of explanation. However, even this side surface 120S having the inclination angle range α of 0 degrees can generate an optical effect for suppressing color change in a viewing angle. The center side surface 120S in FIG. 5 has the inclination angle range α of 12 degrees, and its radius of curvature is 55 μm. The right side surface 120 in FIG. 5 has the inclination angle range α of 22 degrees, and its radius of curvature is 31 μm. In FIGS. 5 and 6, in the different concave-and-convex shapes 120, the distance L between both end points of the side surface 120S in the surface direction is fixed as a certain value, and an inclination length as a distance connecting the both end points of the side surface 120S by a straight line is also fixed as a certain value. In addition, the width "a" of the flat portion 122A of the convexity 122 is fixed as a certain value.

Figure 7A:
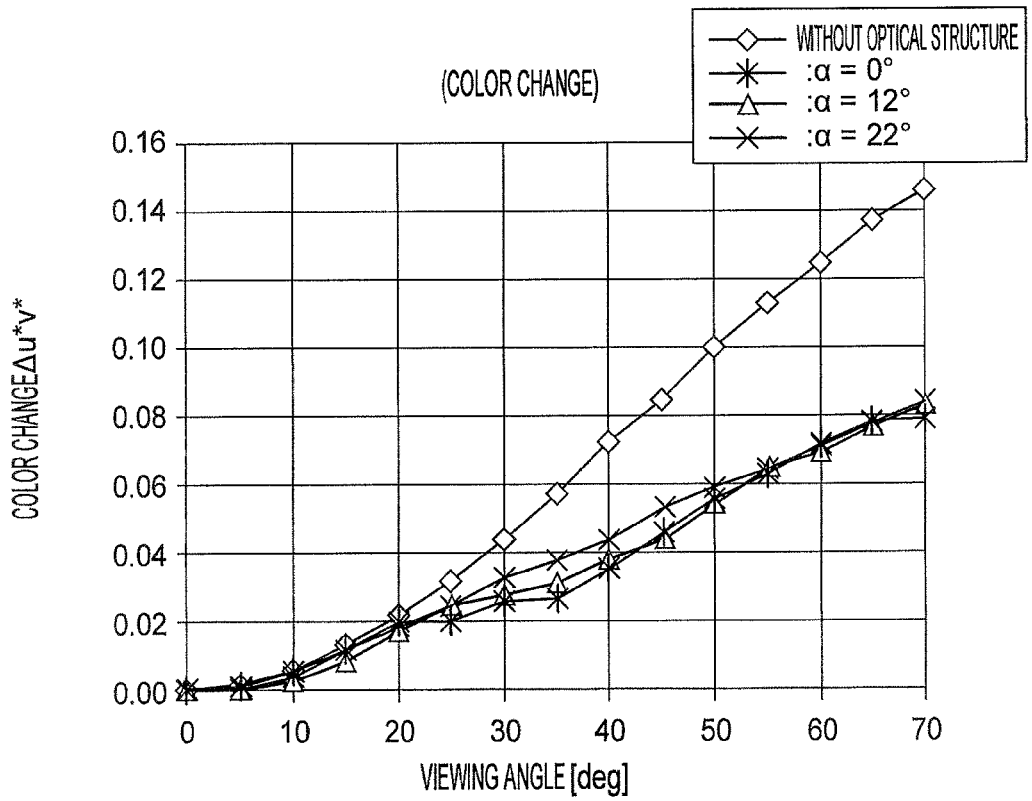
FIG. 7A is a view showing a graph showing color change in a viewing angle of light emitted from the optical structure through the display device, in accordance with a curvature (a difference between a maximum angle and a minimum angle) of the side surface of the concave-and-convex shape of the optical structure.
Figure 7B:
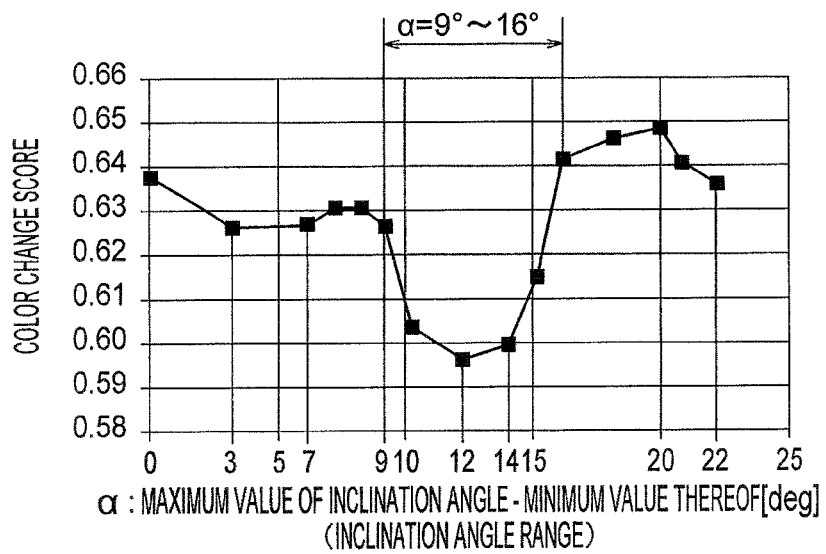
FIG. 7B is a view showing a graph showing a degree of color change of light emitted from the optical structure through the display device, in accordance with a curvature (a difference between a maximum angle and a minimum angle) of the side surface of the concave-and-convex shape of the optical structure.

FIGS. 7A and 7B are graphs showing color change in a viewing angle of optical structures 100 corresponding to the three concave-and-convex shapes 120 (α=0 degrees, 12 degrees, 22 degrees) shown in FIG. 6. To be specific, FIGS. 7A and 7B are graph showing color change of light emerged from the optical structures 100 corresponding to the aforementioned respective concave-and-convex shapes 120, when the ratio β, which is a ratio of a total length of the flat portions 121A, 122A with respect to a length of one cycle of the concavity 121 and the convexity 122 of the concave-and-convex shape 120, is 0.80. FIG. 7A is a graph in which an axis of abscissa shows an angle of light in a viewing angle, the light being emerged from the optical structure 100, and an axis of ordinate shows color change Δu'v'. FIG. 7A shows color change in a viewing angle of light that was incident from the body (the side of the liquid crystal panel 15) of the display device 10 and was emerged from the optical structures 100 under the aforementioned conditions. When the angle shown by the axis of abscissa is 0 degrees (deg), it means that light is observed along the normal direction. For example, in the case of 30 degrees, light was observed along a direction inclined at 30 degrees with respect to the normal direction. In addition, the color change Δu'v' means a color difference, which is calculated from colors defined by u' and v' in a uniform color space. A value of Δu'v' at an angle θ in a certain viewing angle is expressed by the following Expression (1).

$$\Delta u'v'(\theta) = \sqrt{(u'(\theta)-u'(0))^2 - (v'(\theta)-v'(0))^2} \quad (1)$$

The above u' and v' as color coordinates in a uniform color space in the Expression (1) are expressed by the following Expressions (2-1) and (2-2).

$$u' = \frac{4x}{-2x+12y+3} \quad (2\text{-}1)$$

$$v' = \frac{9y}{-2x+12y+3} \quad (2\text{-}2)$$

In the above respective expressions, x and y are color coordinates defined by CIE1931 color space (CIExyY color space).

FIG. 7S is a graph in which an axis of abscissa shows the inclination angle range α, and an axis of ordinate shows a color change score. FIG. 7B shows color change scores of light that was incident from a body (the side of the liquid crystal panel 15) of the display device 10 and was emerged from the optical structures 100 under the aforementioned conditions. The color change score is a barometer which shows that, when a value thereof is smaller, color change is more considerably and effectively suppressed in all the range of a viewing angle of 0 to 60 degrees, as compared with a case in which the optical structure 100 is not provided. The color change score is calculated by the following Expression (3). In the Expression (3), θ shows an angle in the viewing angle, Film means a case where the optical structure 100 is provided on the display device 10, and NonFilm means a case where the optical structure 100 is not provided on the display device 10. The color change score is a barometer that is uniquely made by the present inventors in order to evaluate a color change degree. As long as the color change Δu'v' can be specified, the color change score can be used for evaluating a member similar to the optical structure 100 according to this embodiment.

$$\text{Color Change Score} = \sum_{\theta=0}^{60} \frac{|\Delta u'v'(\theta) - \Delta u'v'(\theta+5)|_{Film}}{|\Delta u'v'(\theta) - \Delta u'v'(\theta+5)|_{NonFilm}} \quad (3)$$

In the color change evaluation shown in FIGS. 7A and 7B, a brightness evaluation shown in FIGS. 8A and 8B and a contrast evaluation shown in FIGS. 9A and 9B, which are described later, a multi-domain type VA type liquid crystal display device manufactured by Sony Corporation was used as the body of the display device on which the optical structure 100 was provided. A blue image was displayed on the body of the display device by a pattern generator. Color change when the image was displayed on the body of the display device without the optical structure 100, and color change when the image was displayed thereon with the optical device 100 were evaluated by using a "spectroradiometer SR-2" manufactured by TOPCON Corporation. Below described evaluations shown in FIGS. 11A to 13B and evaluations shown in FIGS. 13A to 16B were carried out under the same conditions as described above.

In view of FIG. 7A created as described above, it can be understood that, when the display device 10 was provided with the optical structure 100 in which the concave-and-convex shape 120 having the side surface S with the inclination angle range α of 0 degrees, 12 degrees or 22 degrees, color change in a viewing angle was suppressed, as compared with the display device 100 which was not provided with the optical structure 100. On the other hand, in the case where the inclination angle range α is 0 degrees, within a range of 30 to 45 degrees of a viewing angle, it cannot be said that the color change graph smoothly transitions in a viewing angle. From this tendency, the present inventors have found that, when the inclination angle range α is too small, the diffusion effect is weak so that the color change suppression effect may be insufficient. In FIG. 6, in the case of the side surface 120S having the inclination angle range α of 0 degrees, the light totally reflected by the side surface 120S emerges in a fixed angle direction. Thus, because of the phenomenon in which an angle at which light is diffused is small, it is considered that, when the inclination angle range α is too small, the diffusion effect is weak so that the color change suppression effect tends to be insufficient.

In the case of the inclination angle range α of 22 degrees, it can be understood that the color change suppression effect is weak within a range of 30 to 45 degrees in a viewing angle, as compared with the other cases. From this tendency, the present inventors have found that, when the inclination angle range α is too large, the diffusion effect is weak so that the color change suppression effect may be insufficient. In FIG. 6, in the case of the side surface 120S having the inclination angle range α of 22 degrees, the light hits onto the side surface 120S at an angle not less than a critical angle, and refracts to escape. Because of such a phenomenon, it is considered that, when the inclination angle range α is too large, the diffusion effect is weak so that the color change suppression effect tends to be insufficient.

On the other hand, the color change score in FIG. 7B, which is calculated by the Expression (3), is a barometer which shows that, when a value thereof is smaller, color change is more considerably and more smoothly suppressed in a viewing angle. In view of FIG. 7B, it can be understood that, when the inclination angle range α is within a range of not less than 9 degrees and not more than 16 degrees, the color change score tends to be remarkably suppressed. When the inclination angle range α is within a range of not less than 7 degrees and not more than 20 degrees, the color change score tends to be lower than the color change score outside this range. Thus, it can be said that the inclination angle range α of not less than 7 degrees and not more than 20 degrees is preferred in terms of color change suppression. However, when the inclination angle range α is within a range of not less than 9 degrees and not more than 16 degrees, the value of the color change score is particularly low relatively, it can be said that such a range is particularly preferred. From this point and the respective findings about the above-described difference in the color change, it can be concluded that, when the inclination angle range α of the side surface 120S is within a range of not less than 9 degrees and not more than 16 degrees, color change dispersion in a viewing angle is significantly suppressed. FIG. 7B also shows a color change score in the optical structure 100 in which the inclination angle range α is different from ones illustrated in FIG. 7A.

From the above, the present inventors have found that, as an example, when the ratio β of the flat portions 121A, 122A with respect to one cycle of the concave-and-convex shape 120 is 0.80, a preferred range of the inclination angle range α is not less than 7 degrees and not more than 20 degrees, a particularly preferred range thereof is not less than 9 degrees and not more than 16 degrees. It was practically confirmed that, with such a range, the color change dispersion in a viewing angle could be effectively suppressed, as compared with a range outside this range. In the graph of FIG. 7B, when the inclination angle range α exceeds a position of 9 degrees, the color change score steeply decreases, when the inclination angle range α falls below a position of 16 degrees, the color change score steeply decreases, and at the position of 16 degrees, the value of the color change score is relatively sufficiently decreases as compared with a position of larger degrees, so that criticality can be found at the respective positions. In the aforementioned preferred inclination angle range α, the points at which the color change score steeply decreases are set as a lower limit value and an upper limit value. Note that the inclination angle range α of not less than 9 degrees and not more than 16 degrees is preferred, and the inclination angle range of not less than 10 degrees and not more than 15 degrees is more preferred.

In addition, the present inventors have found that, when the value of the ratio β is varied to the plus side from 0.80, the range in which the color change score steeply decreases, as shown in FIG. 7B, tends to shift in the plus direction of the inclination angle degree a, while spreading in the axis of abscissa, and that, when the value of the ratio β is varied to the minus side from 0.80, the range in which the color change score steeply decreases, as shown in FIG. 7B, tens to shift in the minus direction. Thus, when the ratio β is 0.80 as described above, the particularly preferred inclination angle range α is not less than 9 degrees and not more than 16 degrees. However, when the ratio β varies, such a preferred range also varies.

Figure 8A:
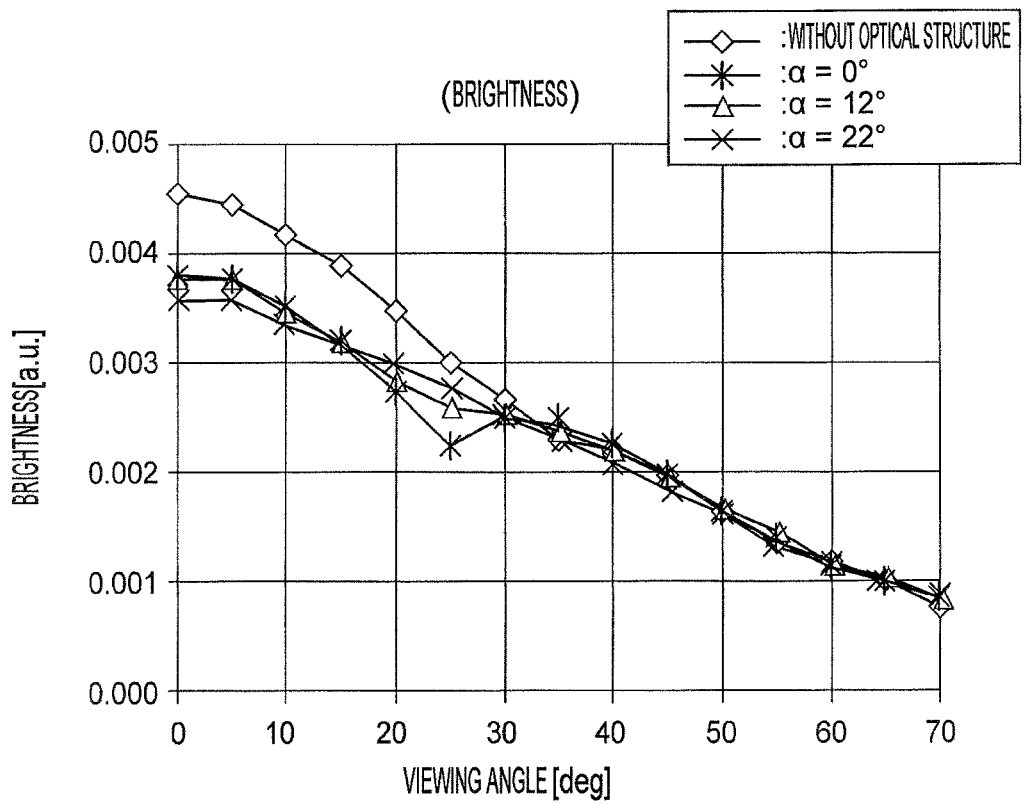
FIG. 8A is a view showing a graph showing a radiance in a viewing angle of light emitted from the optical structure through the display device, in accordance with a curvature (a difference between a maximum angle and a minimum angle) of the side surface of the concave-and-convex shape of the optical structure.
Figure 8B:
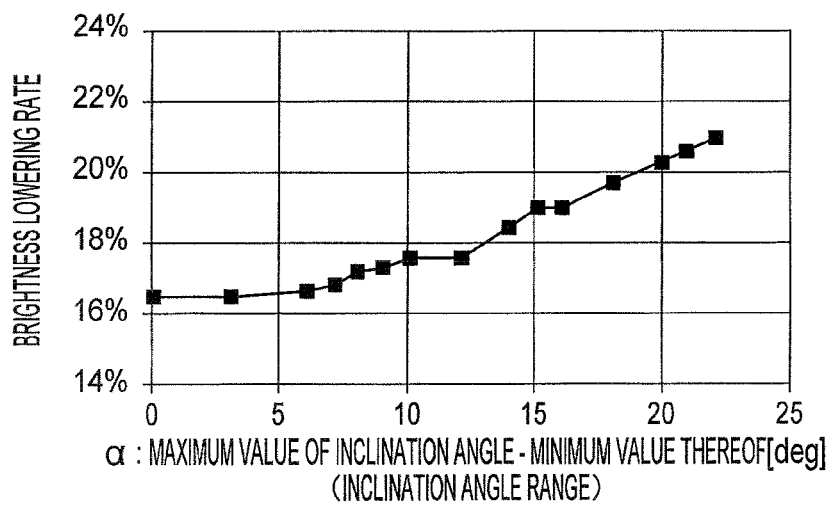
FIG. 8B is a view showing a graph showing a degree of lowering of radiance of light emitted from the optical structure through the display device, in accordance with a curvature (a difference between a maximum angle and a minimum angle) of the side surface of the concave-and-convex shape of the optical structure.

FIG. 8A is a graph showing a radiance at a wavelength of 450 nm in a viewing angle of light which was incident from the body (the side of the liquid crystal panel 15) of the display device 10 and emerged from the optical structure 100. An axis of abscissa shows an angle in a viewing angle, and an axis of ordinate shows a radiance. FIG. 8B is a graph showing a degree of lowering of a radiance of light which was incident from the body (the side of the liquid crystal panel 15) of the display device 10 and emerged from the optical structures 100 under the aforementioned conditions. An axis of abscissa shows a value of the inclination angle range α, and an axis of ordinate shows a radiance lowering rate (written as brightness lowering rate in FIG. 8B). The radiance lowering rate is a barometer which shows that, when a value thereof is smaller, a degree of lowering of a radiance is smaller, as compared with a case in which the optical structure 100 is not provided.

Figure 9A:
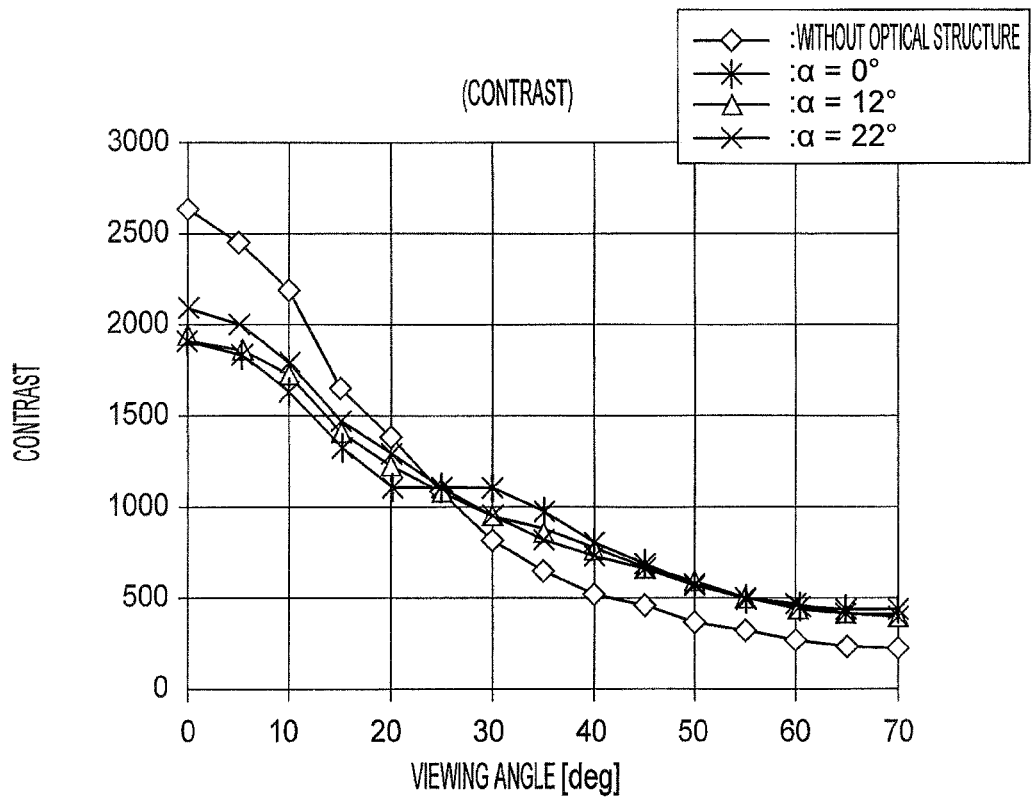
FIG. 9A is a view showing a graph showing a contrast in a viewing angle of light emitted from the optical structure through the display device, in accordance with a curvature (a difference between a maximum angle and a minimum angle) of the side surface of the concave-and-convex shape of the optical structure.
Figure 9B:
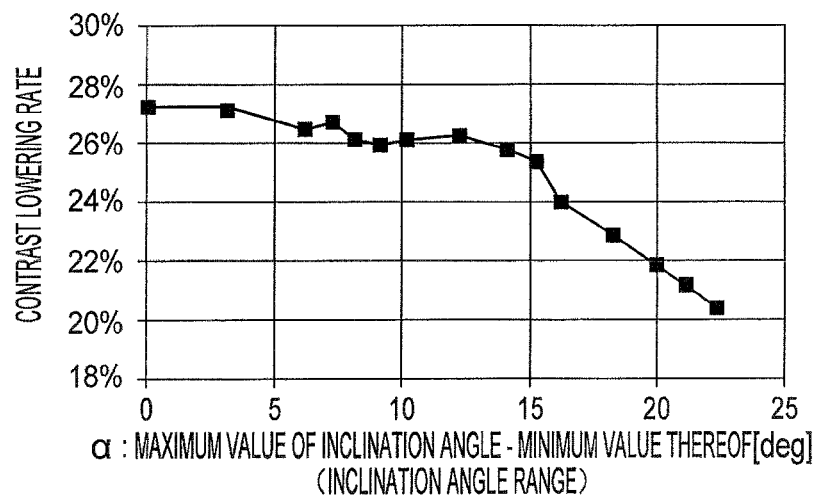
FIG. 9B is a view showing a graph showing a degree of lowering of contrast of light emitted from the optical structure through the display device, in accordance with a curvature (a difference between a maximum angle and a minimum angle) of the side surface of the concave-and-convex shape of the optical structure.

In addition, FIG. 9A is a graph showing a contrast in a viewing angle of light which was incident from the body (the side of the liquid crystal panel 15) of the display device 10 and emerged from the optical structure 100. An axis of abscissa shows an angle in a viewing angle, and an axis of ordinate shows a contrast. FIG. 9B is a graph showing a degree of lowering of contrast of light which was incident from the body (the side of the liquid crystal panel 15) of the display device 10 and emerged from the optical structures 100 under the aforementioned conditions. An axis of abscissa shows a value of the inclination angle range α, and an axis of ordinate shows a contrast lowering rate. The contrast lowering rate is a barometer which shows that, when a value thereof smaller, a degree of lowering of contrast is smaller, as compared with a case in which the optical structure 100 is not provided.

When the aforementioned inclination angle range α is within a range of not less than 9 degrees and not more than 16 degrees, it can be concluded that lowering of a brightness and a contrast is not excessive, as compared with a case in which the optical structure 100 is not provided. Thus, within this range, color change in a viewing angle can be effectively suppressed, while maintaining good display quality of the display device 10 in a front view. Also from this point, it can be said that the inclination angle range α is preferably not less than 9 degrees and not more than 16 degrees. Note that such a numerical range is nothing more than an example of a particularly preferred range, and that the present invention can achieve a useful effect even with a numerical range different from the illustrated one.

(Relationship Between Average Inclination Angle of Side Surface of Concave-and-Convex Shape and Color Change)

Figure 10:
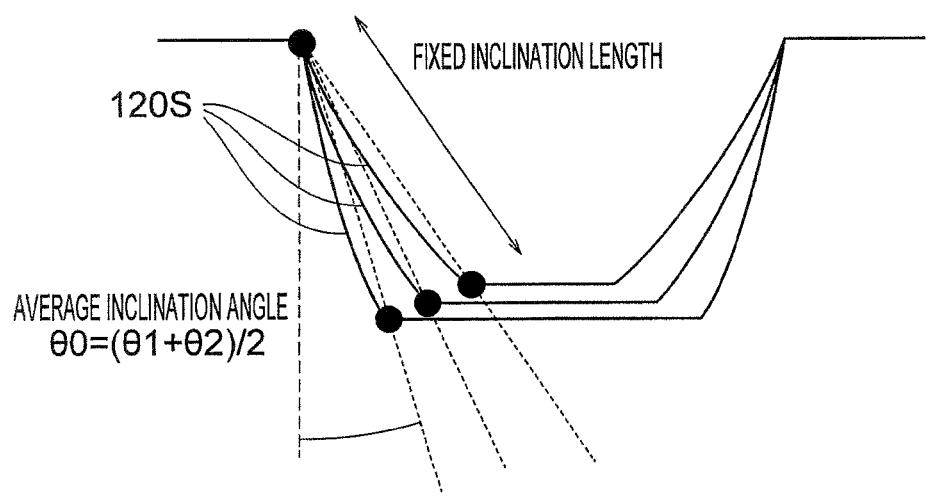
FIG. 10 is a view showing a plurality of side surfaces of concave-and-convex shapes of the optical structure, the side surfaces having average inclination angles different from one another.
Figure 11A:
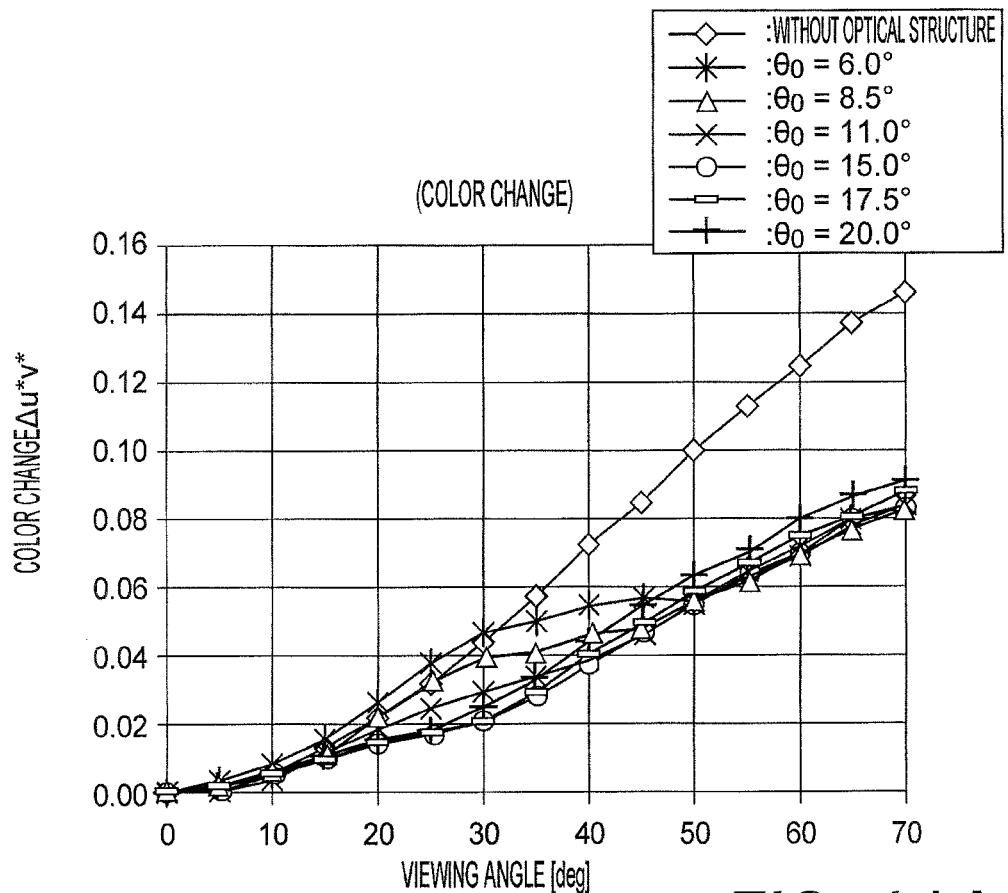
FIG. 11A is a view showing a graph showing color change in a viewing angle of light emitted from the optical structure through the display device, in accordance with an average inclination angle of the side surface of the concave-and-convex shape of the optical structure.
Figure 11B:
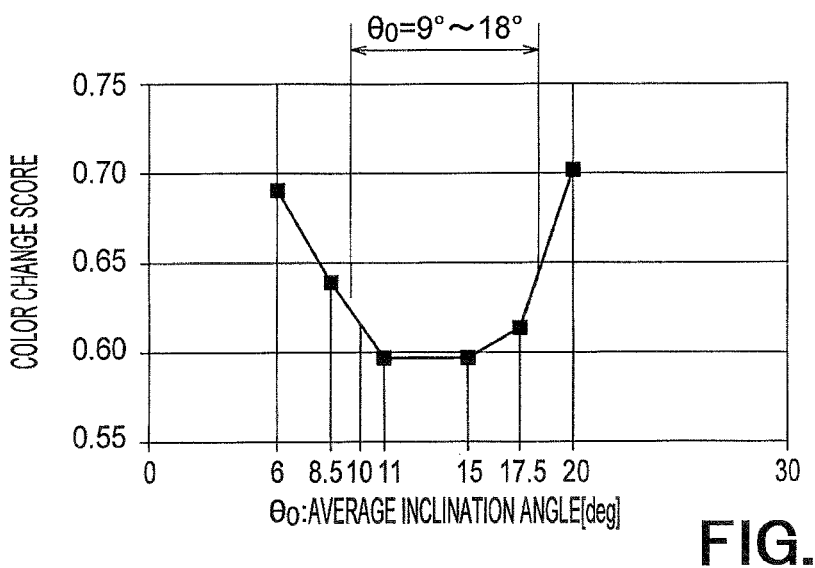
FIG. 11B is a view showing a graph showing a degree of color change of light emitted from the optical structure through the display device, in accordance with an average inclination angle of the side surface of the concave-and-convex shape of the optical structure.

Next, the reason why the average inclination angle θ0 of the side surface 120S of the concave-and-convex shape 120 is preferably not less than 9 degrees and not more than 18 degrees is described. FIG. 10 shows a plurality of (three) side surfaces 120S of the concave-and-convex shape 120, which have different average inclination angle θ0. As the side surface 120S is inclined rightward in FIG. 10, it means that the average inclination angle θ0 increases. The respective side surfaces 120S are set to have the same curvature with each other (i.e., a is fixed). FIGS. 11A and 11B show graphs showing color change in a viewing angle of optical structures 100 corresponding to the concave-and-convex shapes 120 in which the average inclination angle θ0=6.0 degrees, 8.5 degrees, 11 degrees, 15.0 degrees, 17.5 degrees and 20 degrees. In more detail, FIGS. 11A and 11B are graphs for evaluating color change of the optical structures 100 corresponding to the aforementioned respective concave-and-convex shapes 120, when the ratio β, which is a ratio of a total length of the flat portions 121A, 122A with respect to a length of one cycle of the concavity 121 and the convexity 122 of the concave-and-convex shape 120, is 0.80.

FIG. 11A is a graph in which an axis of abscissa shows an angle in a viewing angle of light emerged from the optical structure 100, and an axis of ordinate shows a color change $\Delta u'v'$. FIG. 11A shows color change in a viewing angle of light which was incident from the body (the side of the liquid crystal panel 15) of the display device 10 and emerged from the optical structure 100. In the optical structures 100 under the above respective conditions, the side surfaces 120S are set to have the same curvature with each other. In addition, FIG. 11B is a graph in which an axis of abscissa shows a value of the average inclination angle $\theta 0$, and an axis of ordinate shows a color change score. FIG. 11B shows a color change score of light which was incident from the body (the side of the liquid crystal panel 15) of the display device 10 and emerged from the optical structure 100. The color change score is calculated by the aforementioned Expression (3).

In view of FIG. 11A created as described above, it can be understood that, when the display device 10 was provided with the optical structure 100 in which the concave-and-convex shape 120 was formed such that the side surface 120S had the average inclination angle $\theta 0$ of 11 degrees, 15 degrees, 17.5 degrees or 20 degrees, color change in a viewing angle was suppressed, as compared with a case in which the display device 10 was not provided with the optical structure 100. On the other hand, when the display device 10 was provided with the optical structure 100 in which the concave-and-convex shape 120 was formed such that the side surface 120S had the average inclination angle $\theta 0$ of 6 degrees or 8.5 degrees, color change within a range of from 15 to 25 degrees was larger, as compared with a case in which the optical structure 100 was not provided. Thus, it can be understood that they are not preferred. From this tendency, the present inventors have found that, when the average inclination angle $\theta 0$ is too small, since an amount of light that is totally reflected by the side surface 120S reduces, the diffusion effect is weak so that the color change suppression effect may be insufficient.

On the other hand, in view of FIG. 11B, it can be understood that, when the average inclination angle $\theta 0$ is within a range of not less than 9 degrees and not more than 18 degrees, the color change score is suitably suppressed. From this point and the finding about the above-described difference in the color change, it can be concluded that, when the average inclination angle $\theta 0$ is within a range of not less than 9 degrees and not more than 18 degrees, color change dispersion in a viewing angle is suitably suppressed.

From the above, the present inventors specify that a preferred range of the average inclination angle $\theta 0$ is not less than 9 degrees and not more than 18 degrees. It was practically confirmed that, with such a range, the color change dispersion in a viewing angle could be effectively suppressed, as compared with a range outside this range. The average inclination angle $\theta 0$ is preferably not less than 9 degrees and not more than 18 degrees, and is more preferably not less than 10 degree and not more than 17.5 degrees. Most preferably, the average inclination angle $\theta 0$ is not less than 11 degree and not more than 15 degrees. The color change graph shown in FIG. 11B varies depending on a value of the ratio $\beta$ which is a ratio of a total length of the flat portions 121A, 122A with respect to a length of one cycle of the concavity 121 and the convexity 122 of the concave-and-convex shape 120. However, the present inventors have found that, when the average inclination angle $\theta 0$ is not less than 9 degrees and not more than 18 degrees, a good color change suppression effect can be obtained irrespective of the value of the ratio $\beta$.

Figure 12A:
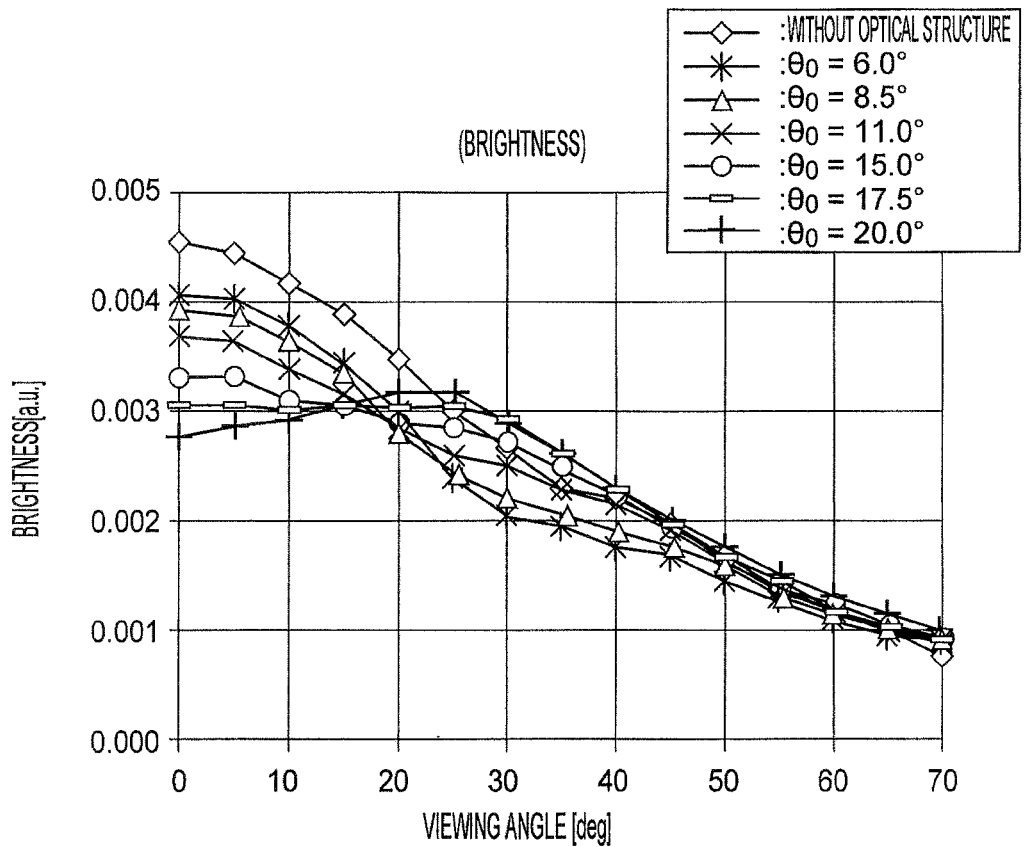
FIG. 12A is a view showing a graph showing a radiance in a viewing angle of light emitted from the optical structure through the display device, in accordance with an average inclination angle of the side surface of the concave-and-convex shape of the optical structure.
Figure 12B:
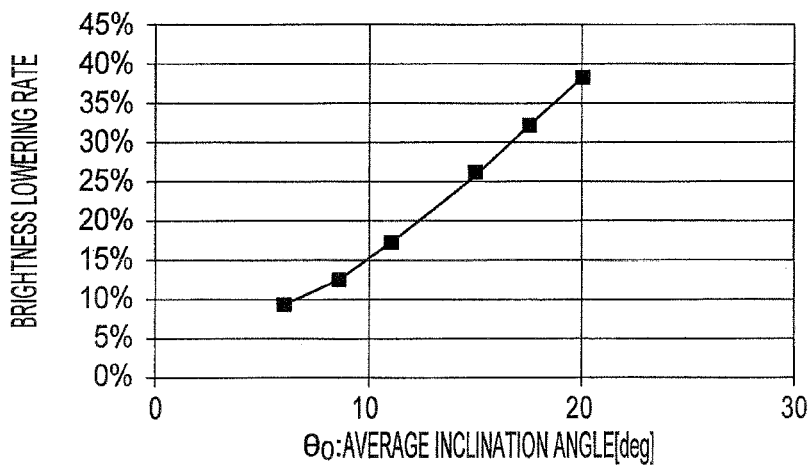
FIG. 12B is a view showing a graph showing a degree of lowering of radiance of light emitted from the optical structure through the display device, in accordance with an average inclination angle of the side surface of the concave-and-convex shape of the optical structure.

In addition, FIG. 12A is a graph showing a radiance at a wavelength of 450 nm in a viewing angle of light which was incident from the body (the side of the liquid crystal panel 15) of the display device 10 and emerged from the optical structure 100. An axis of abscissa shows an angle in a viewing angle, and an axis of ordinate shows a radiance. FIG. 12B is a graph showing a degree of lowering of a radiance of light which was incident from the body (the side of the liquid crystal panel 15) of the display device 10 and emerged from the optical structures 100 under the aforementioned conditions. An axis of abscissa shows a value of the average inclination angle $\theta 0$, and an axis of ordinate shows a radiance lowering rate (written as brightness lowering rate in FIG. 12B). The radiance lowering rate is a barometer which shows that, when a value thereof is smaller, a degree of lowering of a radiance is smaller, as compared with a case in which the optical structure 100 is not provided.

Figure 13A:
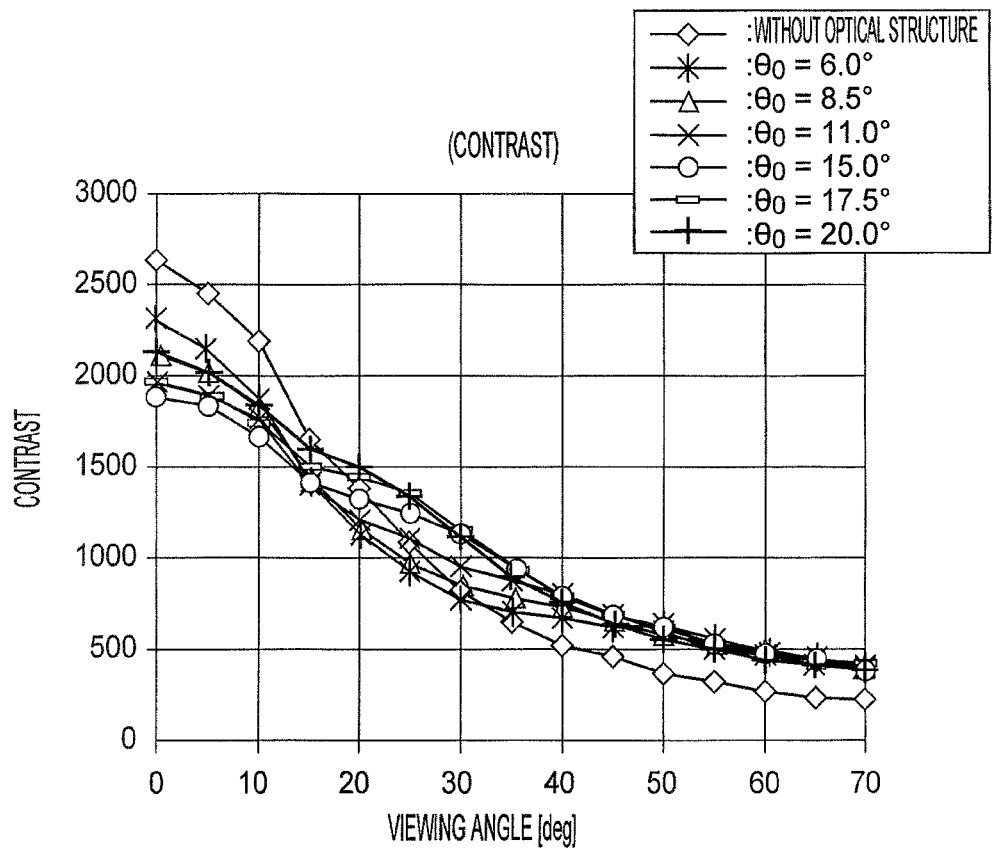
FIG. 13A is a view showing a graph showing a contrast in a viewing angle of light emitted from the optical structure through the display device, in accordance with an average inclination angle of the side surface of the concave-and-convex shape of the optical structure.
Figure 13B:
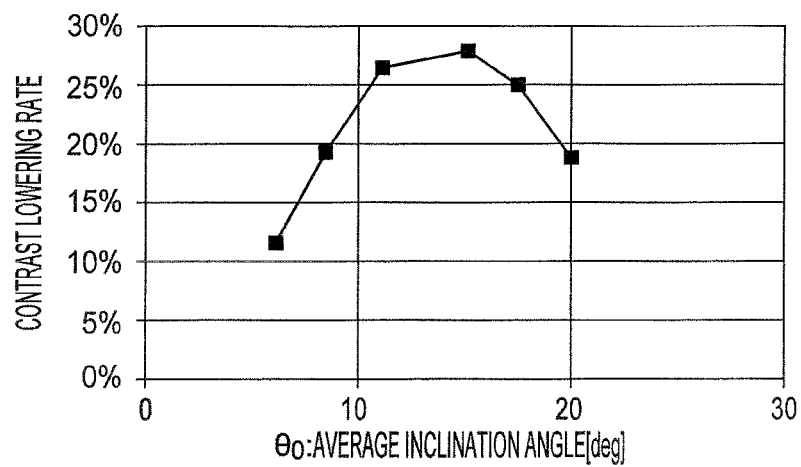
FIG. 13B is a view showing a graph showing a degree of lowering of contrast of light emitted from the optical structure through the display device, in accordance with an average inclination angle of the side surface of the concave-and-convex shape of the optical structure.

In addition, FIG. 13A is a graph showing a contrast in a viewing angle of light which was incident from the body (the side of the liquid crystal panel 15) of the display device 10 and emerged from the optical structure 100. An axis of abscissa shows an angle in a viewing angle, and an axis of ordinate shows a contrast. FIG. 13B is a graph showing a degree of lowering of contrast of light which was incident from the body (the side of the liquid crystal panel 15) of the display device 10 and emerged from the optical structures 100 under the aforementioned conditions. An axis of abscissa shows a value of the average inclination angle $\theta 0$, and an axis of ordinate shows a contrast lowering rate. The contrast lowering rate is a barometer which shows that, when a value thereof smaller, a degree of lowering of contrast is smaller, as compared with a case in which the optical structure 100 is not provided.

From the result of FIGS. 12A to 13B, it was found that, when the average inclination angle $\theta 0$ is not less than 9 degrees and not more than 18 degrees, there is a trade-off relationship between the brightness/contrast and color change.

(Relationship Between Ratio of Flat Portions of Concave-and-Convex Shape and Color Change)

Figure 14A:
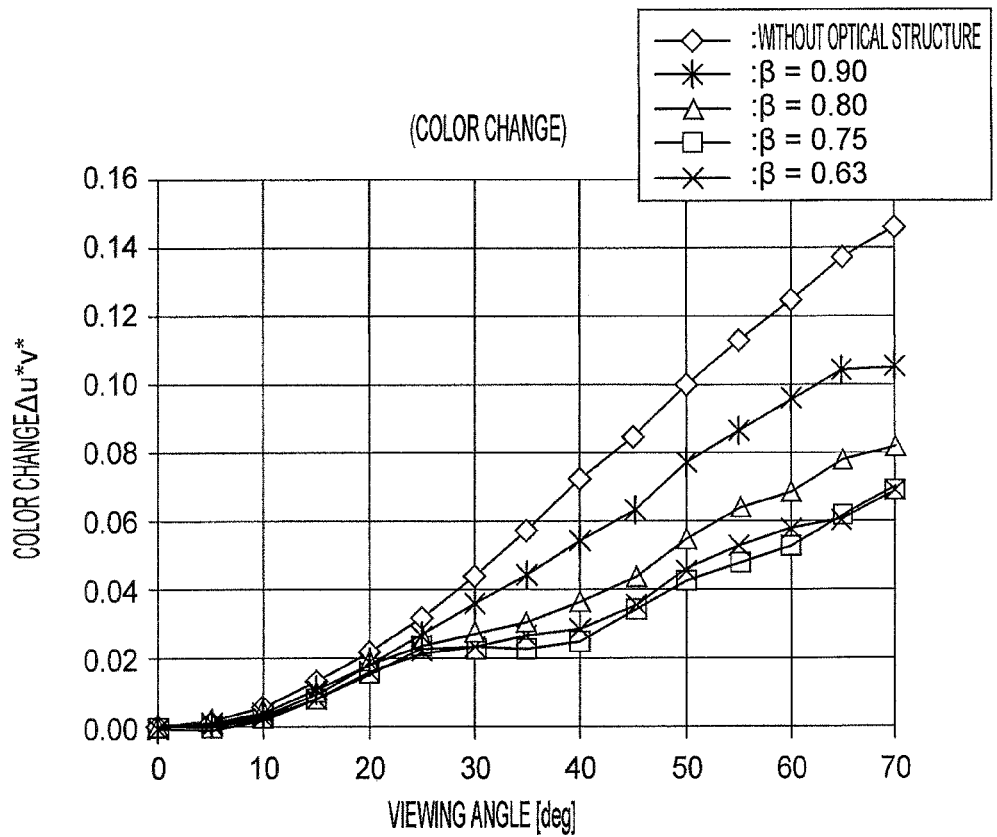
FIG. 14A is a view showing a graph showing color change in a viewing angle of light emitted from the optical structure through the display device, in accordance with a ratio of flat portions of the concave-and-convex shape of the optical structure.
Figure 14B:
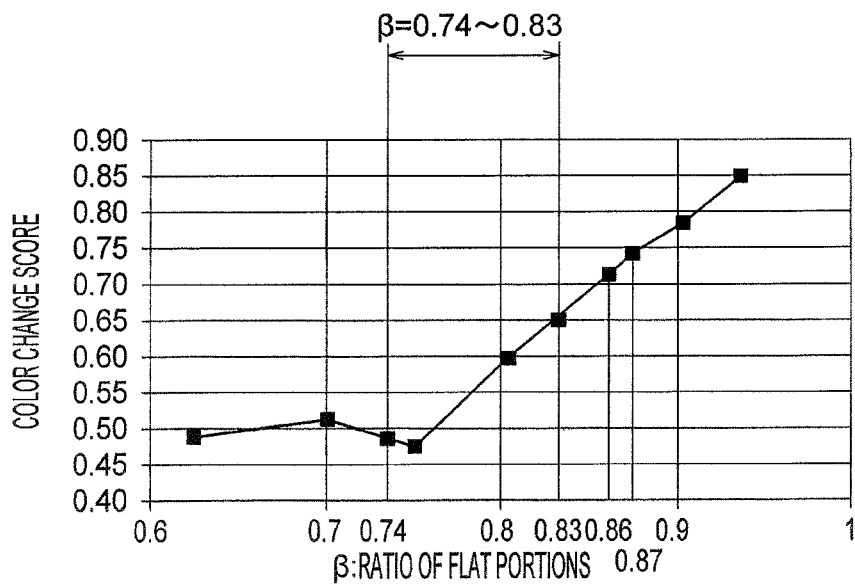
FIG. 14B is a view showing a graph showing a degree of color change of light emitted from the optical structure through the display device, in accordance with a ratio of flat portions of the concave-and-convex shape of the optical structure.

Next, the reason why the ratio $\beta$, which is a ratio of a total value of widths of the flat portions 121A, 122A with respect to a length of one cycle of the concavity 121 and the convexity 122 of the concave-and-convex shape 120, is particularly preferably not less than 0.74 and not more than 0.83, when the inclination angle range $\alpha$ is 12 degrees by way of example, is described. As described above, based on the intensive studies, the present inventors have found that, in the optical structure 100, the ratio $\beta$ within a range of not less than 0.60 and not more than 0.90. Herebelow, the fact that, when the inclination angle $\alpha$ is 12 degrees, the ratio $\beta$ within a range of not less than 0.74 and not more than 0.83 is particularly preferred is described based on experiments or simulations. Graphs shown in FIGS. 14A and 14B are graphs which show, when the inclination angle range $\alpha$ is 12 degrees, color change in a viewing angle of optical structures 100 corresponding to the concave-and-convex shapes 120 in which the ratio $\beta$ is 0.90, 0.80, 0.75 and 0.63. FIG. 14A is a graph in which an axis of abscissa shows an angle in a viewing angle of light emerged from the optical structure 100, and an axis of ordinate shows a color change $\Delta u'v'$. FIG. 14A shows color change in a viewing angle of light which was incident from the body (the side of the liquid crystal panel 15) of the display device 10 and emerged from the optical structure 100. In addition, FIG. 14B is a graph in which an axis of abscissa shows a value of the ratio β, and an axis ordinate shows a color change score. FIG. 14B shows a color change score of light which was incident from the body (the side of the liquid crystal panel 15) of the display device 10 and emerged from the optical structure 100. The color change score is calculated by the aforementioned Expression (3).

In view of FIG. 14A, it can be understood that, when the display device 10 was provided with the optical structure 100 in which the concave-and-convex shape 120 was formed to have the side surface 120S in which the ratio 3 of the flat portions was 0.63, 0.75, 0.80 and 0.90, color change in a viewing angle was suppressed, as compared with a case in which the display device 10 was not provided with the optical structure 100. However, it can be understood that, in the case of the concave-and-convex shape 120 having the side surface 120S in which the ratio 1 is 0.90, color change degree is smaller, with respect to a case in which the display device 10 was not provided with the optical structure 100. From this tendency, the present inventors have found that, when the ratio β is too large, the diffusion effect by the side surface 120S is weak so that the color change suppression effect may be insufficient.

On the other hand, in view of FIG. 14B, it can be understood that, when the ratio β of the flat portions is 0.63, 0.75, 0.80 and 0.90, color change in a viewing angle is suppressed. However, when the ratio β is 0.90, the color change score is relatively high, i.e., the color change is evaluated to be relatively large. In addition, when the ratio β is 0.63, the color change score is low, i.e., the color change is evaluated to be small. However, regarding the color change, there is no continuity to a value larger than this value "0.63", whereby it cannot be said that a stable color change suppression effect can be obtained. FIG. 14B also shows a color change score in the optical structure 100 in which the ratio β of the flat portions is different from ones illustrated in FIG. 14A. From the above points, the present inventors have concluded that, when the inclination angle range α is 12 degrees and the ratio β is within a range of not less than 0.70 and not more than 0.86, color change dispersion in a viewing angle can be stably suppressed. In consideration of the graphs, it is considered that the ratio β of not less than 0.74 and not more than 0.83 is particularly preferred.

Figure 15A:
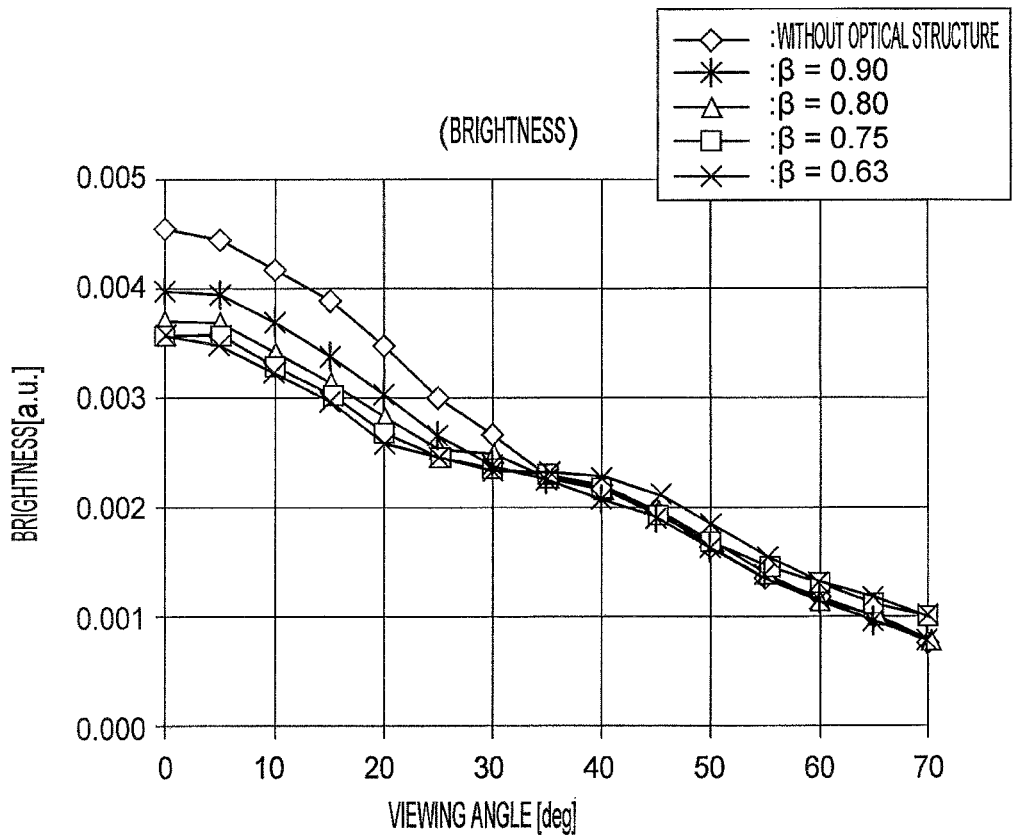
FIG. 15A is a view showing a graph showing a radiance in a viewing angle of light emitted from the optical structure through the display device, in accordance with a ratio of flat portions of the concave-and-convex shape of the optical structure.
Figure 15B:
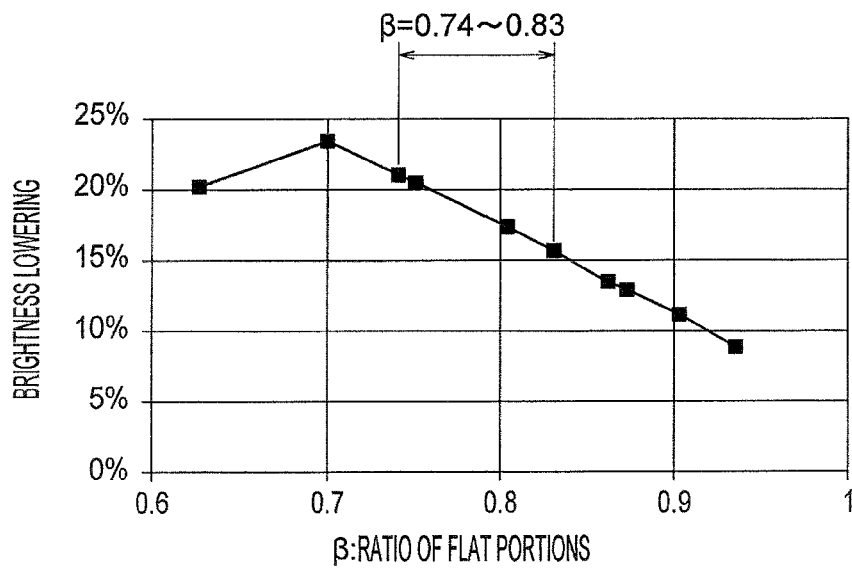
FIG. 15B is a view showing a graph showing a degree of lowering of radiance of light emitted from the optical structure through the display device, in accordance with a ratio of flat portions of the concave-and-convex shape of the optical structure.

In addition, FIG. 15A is a graph showing a radiance at a wavelength of 450 nm in a viewing angle of light which was incident from the body (the side of the liquid crystal panel 15) of the display device 10 and emerged from the optical structure 100. An axis of abscissa shows an angle in a viewing angle, and an axis of ordinate shows a radiance. FIG. 15B is a graph showing a degree of lowering of a radiance of light which was incident from the body (the side of the liquid crystal panel 15) of the display device 10 and emerged from the optical structures 100 under the aforementioned conditions. An axis of abscissa shows a value of the ratio β, and an axis of ordinate shows a radiance lowering rate (written as brightness lowering rate in FIG. 15B). The radiance lowering rate is a barometer which shows that, when a value thereof is smaller, a degree of lowering of a radiance is smaller, as compared with a case in which the optical structure 100 is not provided.

Figure 16A:
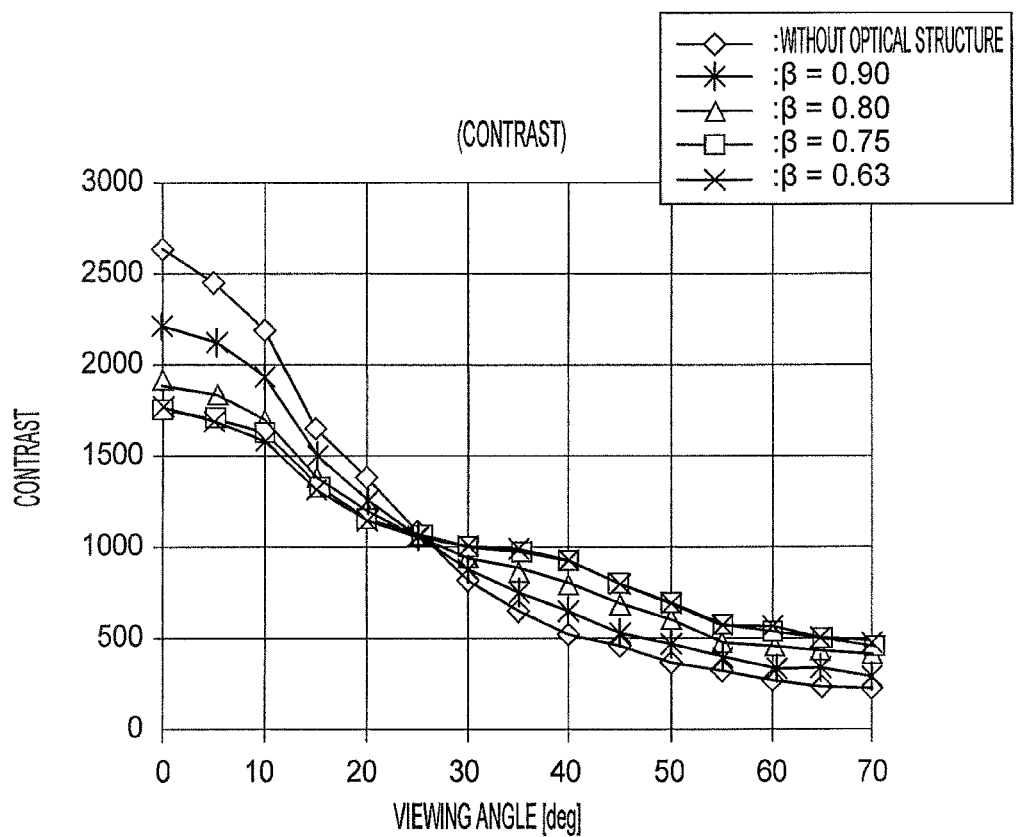
FIG. 16A is a view showing a graph showing a contrast in a viewing angle of light emitted from the optical structure through the display device, in accordance with a ratio of flat portions of the concave-and-convex shape of the optical structure.
Figure 16B:
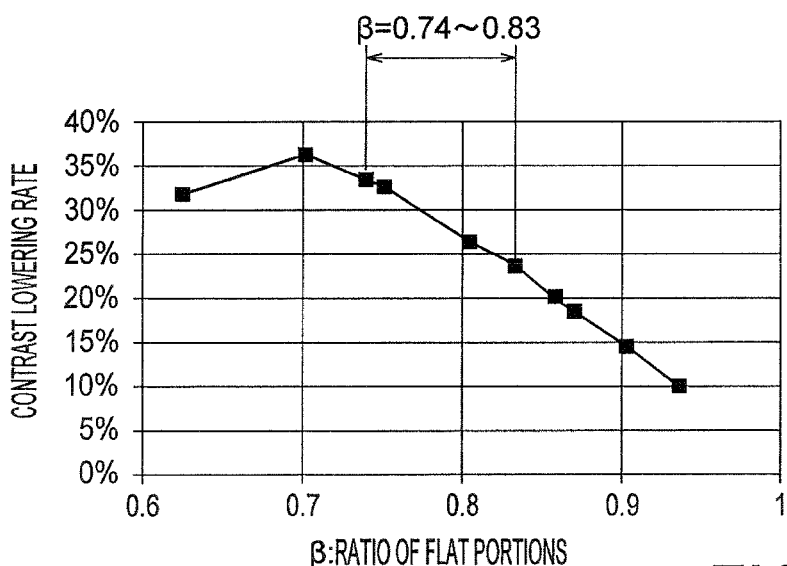
FIG. 16B is a view showing a graph showing a degree of lowering of contrast of light emitted from the optical structure through the display device, in accordance with a ratio of flat portions of the concave-and-convex shape of the optical structure.

In addition, FIG. 16A is a graph showing a contrast in a viewing angle of light which was incident from the body (the side of the liquid crystal panel 15) of the display device 10 and emerged from the optical structure 100. An axis of abscissa shows an angle in a viewing angle, and an axis of ordinate shows a contrast. FIG. 16B is a graph showing a degree of lowering of contrast of light which was incident from the body (the side of the liquid crystal panel 15) of the display device 10 and emerged from the optical structures 100 under the aforementioned conditions. An axis of abscissa shows a value of the ratio β, and an axis of ordinate shows a contrast lowering rate. The contrast lowering rate is a barometer which shows that, when a value thereof smaller, a degree of lowering of contrast is smaller, as compared with a case in which the optical structure 100 is not provided.

When the aforementioned ratio β is within a range of not less than 0.74 and not more than 0.83, it can be concluded that lowering of a brightness and a contrast is not excessive, as compared with a case in which the optical structure 100 is not provided. Thus, within this range, color change in a viewing angle can be effectively suppressed, while maintaining good display quality of the display device 10 in a front view. Also from this point, it can be said that the ratio β is preferably not less than 0.74 and not more than 0.83.

In addition, as described above, when the inclination angle range α is 12 degrees, a particularly preferred range of the ratio β is not more than 0.74 and not less than 0.83. On the other hand, as described in the aforementioned "Relationship between Inclination Angle Range (Curvature) of Side Surface of Concave-and-convex shape and Color Change", when the ratio β is 0.80, a particularly preferred range of the inclination angle range α is not less than 9 degrees and not more than 16 degrees. From the intensive studies on these results, the present inventors have reached a relationship in which a preferred value of the inclination angle range α varies depending on a value of the ratio β.

The inclination angle range α is preferably not less than 83.33β−59.67 degrees and not more than 80β−44 degrees, and more preferably not less than 66.6β−37.33 degrees and not more than 100β−71 degrees. Note that α is more than 0 and that β is less than 1. From the above expressions, it can be said that β is preferably not less than 0.55 and less than 1.00, and that α is preferably greater than 0 and less than 36 degrees.

When the optical structure 100 is manufactured in accordance with these conditions, it is possible to obtain the optical structure 100 capable of simply suppressing color change dispersion in a viewing angle while maintaining good display quality of a display device in a front view.

In addition, in the structure of the display device 10 according to this embodiment, light from the surface light source device 20 is incident on the back surface of the optical structure 100. At this time, even when a range of an emission angle of the light from the surface light source device 20 is not less than 0 degrees and not more than 90 degrees, an angular range of a light ray inside the optical structure 100 is narrower than an emission angle range of the light from the surface light source device 100. This is because, when the light is incident on the optical structure 100, the light is refracted. In the structure of the display device 10 according to this embodiment, when an emission angle range of light from the surface light source device 20 is not less than 0 degree and not more than 90 degrees, it is assumed that an angular range of a light ray inside the optical structure 100 is nearly not less than 0 degrees and not more than 60 degrees, although it depends on refractive indexes of the surface light source device 20 and the optical structure 100. To be specific, when a refractive index of the high refractive-index layer 102 is not less than 1.15, an angular range of a light ray inside the optical structure 100 may be nearly not less than 0 degrees and not more than 60 degrees. In addition, when a refractive index of the high refractive-index layer 102 is 1.29, an angular range of a light ray inside the optical structure 100 can be lowered down to not less than 0 degrees and not more than 51 degrees. Further, when a refractive index of the high refractive-index layer 102 is not less than 1.6, which is more easily manufactured, an angular range of a light ray inside the optical structure 100 can be lowered down to not less than 0 degrees and not more than 40 degrees.

It is not necessary that the side surface 120S of the concave-and-convex shape 120 exerts an optical effect on light of an angle larger than a maximum angle of an angular range of a light ray inside the optical structure 100. Based on this point, in consideration of a maximum angle of an angular range of a light ray inside the optical structure 100, the inclination angle range $\alpha$ may be greater than 0 degrees and not more than 60 degrees. Depending on a refractive index value of the high refractive-index layer 102, the inclination angle range $\alpha$ may be greater than 0 degrees and not more than 40 degrees. The present inventors have confirmed that, when the inclination angle range $\alpha$ is not less than 3 degrees, a color change suppression effect can be visually recognized. From this point, the inclination angle range $\alpha$ is preferably not less than 3 degrees and not more than 60 degrees. Depending on a refractive index value of the high refractive-index layer 102, the inclination angle range $\alpha$ is more preferably not less than 3 degrees and not more than 40 degrees. Note that the high refractive-index layer in the present invention is referred to as high refractive-index layer because it has a refractive index higher than that of the low refractive-index layer.

(Behavior of Light in Display Device)

Next, a behavior of light in the display device 10 according to this embodiment is described with reference again to FIG. 2. In order to display an image on the display device 10 according to this embodiment, light is firstly emitted from the light source 24. As shown in FIG. 2, the light incident from the incident surface 33 into the light guide plate 30 is guided in the light guide plate 30 substantially along the first direction $d_1$ toward the opposite surface 34 which is opposed to the incident surface 33 along the first direction $d_1$. The guided light repeats total reflection between the main surfaces 31, 32 of the light guide plate 30. When an incident angle of the light to the main surface 31 becomes less than a total reflection critical angle, the light emerges from the light guide plate 30, as shown by L1 of FIG. 2. When the light emerged from the light guide plate 30 passes through the optical sheet 60, a traveling direction and a polarization state of the light are converted by the unit prisms 70 into desired ones. Then, the light is incident on the liquid crystal panel 15. Then, in the liquid crystal layer 12, transmission or block of the light incident on the liquid crystal panel 15 are controlled for each area that forms a pixel, in accordance with application of voltage. Thus, an image is displayed on the display surface 15A of the liquid crystal panel 15.

In this embodiment, the light emerged from the display surface 15A of the liquid crystal panel 15 is incident on the optical structure 100. At this time, the light incident from the side of the liquid crystal panel 15 into the optical structure 100 is subjected to an optical effect caused by transmission and total reflection by means of the concave-and-convex shape 120. Namely, at this time, the light that travels on a high angle side of a viewing angle is totally reflected so as to be diffused widely in directions including a low angle side, by the side surface 120S of the concave-and-convex shape 120, which is a curved surface that is convex to the low refractive-index layer 103. In addition, the light that is perpendicularly incident on the optical structure 100 travels in the front direction by the flat portions 121A, 122A of the concave-and-convex shape 120 so that its diffusion is suppressed. Thus, color change in a viewing angle is suppressed, and lowering of brightness and contrast in a front view is also suppressed.

Therefore, this embodiment can simply suppressing color change dispersion in a viewing angle, while maintaining good display quality of the display device in a front view. In addition, in this embodiment, when the aforementioned ratio $\beta$ is 0.80, a difference (inclination angle range $\alpha$) between a maximum angle and a minimum angle, which are defined between the side surface 120S of the concave-and-convex shape 120 and the normal direction of the high refractive-index layer 102 and the low refractive-index layer 103, is not less than 9 degrees and not more than 16 degrees, for example, excessive lowering of brightness and contract ban be suppressed. In addition, when the average inclination angle $\theta 0$ of the side surface 120S, which is defined between a straight line connecting both end points of the side surface 120S of the concave-and-convex shape 120 and the normal direction of the high refractive-index layer 102 and low refractive-index layer 103, is not less than 9 degrees and not more than 18 degrees, color change dispersion can be effectively suppressed. Note that such a numerical range is nothing more than an example of a particularly preferred range, and that the present invention can achieve a useful effect even with a numerical range different from the illustrated one.

In addition, as described above, the flat portions 121A, 122A of the concave-and-convex shape 120 have a function for transmitting light, which is perpendicularly incident on the optical structure 100 in a front direction. Thus, in this embodiment, diffusion of emergent light is suppressed, so that lowering of brightness and contrast in a front view is suppressed. On the other hand, the concave-and-convex shape 120 having the flat portions 121A, 122A is advantageous in terms of manufacture. To be specific, even when a ratio between a length of the flat portion 121A and a length of the flat portion 122A is optionally changed to some degree under a condition where the shape of the side surface 120S of the concave-and-convex shape is fixed, an optical property is almost unchanged. Thus, in a design stage, the ratio $\beta$ of the flat portions 121A, 122B with respect to one cycle of the concavity 121 and the convexity 122 of the concave-and-convex shape 120 is fixed at a desired value, and a ratio between a length of the flat portion 121A and a length of the flat portion 122A is optionally changed to some degree, so that it is possible to manufacture the optical structure 100 having a desired optical property by a desired manufacturing process. To be specific, when a ratio of the flat portion 121A of the concavity 121 is large, it is easy to fill the low refractive-index layer 103. When a ratio of the flat portion 122A of the convexity 122 is large, die cutting of the high refractive-index layer 102 is easy. In addition, when the high refractive-index layer 102 is shaped, a problem of mixture of air can be suppressed. It was found that, when a ratio between the flat portion 121A and the flat portion 122A is 7:4, for example, such a manufacturing advantage can be obtained. When a ratio between the flat portion 121A and the flat portion 122A is changed, an optical property is almost unchanged excluding an extreme case. For example, in a case where the inclination angle range $\alpha=12$, the ratio $\beta=0.80$ and the average inclination angle $\theta 0=11$, when a ratio between the flat portions 121A and 122A was changed within 7:3 to 3:7, an optical property was almost unchanged.

On the other hand, a ratio of the width a of the flat portion 122A of the convexity 122 with respect to the pitch P is preferably not less than 0.19 and not more than 0.45. As apparent from FIG. 6, when the width a of the flat portion 122A is too small, light incident on the side surface 120S tends to decrease. The present inventors have confirmed through experiments that, when a ratio of the width a of the flat portion 122A of the convexity 122 with respect to the pitch P is not less than 0.19 and not more than 0.45, color change can be effectively suppressed.

In consideration of easy die cutting, the larger the ratio β is, the more easily die cutting becomes. In consideration of such a manufacturing advantage, the ratio β is preferably not less than 0.50 and less than 1.00. In consideration that a color change suppression effect can be easy ensured, the ratio β is preferably not less than 0.60 and less than 0.90.

In addition, in this embodiment, since a refractive index of the antireflection layer 104 serving as a surface member is not more than 1.40, a critical angle, at which light coming from the display device 10 starts to totally reflect at an interface between the antireflection layer 104 and air, is larger than a case where a general surface material having a refraction index of about 1.40 to 150 is used. Thus, since an amount of light that can be take out can be increased as compared with a general structure, it can be suppressed that a brightness in a viewing angle is undesirably lowered. As shown in FIG. 8A, for example, when the optical structure 100 is used, a brightness in a front view is somewhat lowered. However, in this embodiment, since the antireflection layer 104 having a refractive index of not more than 1.40 increases an amount of light that can be taken out, so that lowering of brightness in a front view can be compensated. Thus, good display quality in the whole viewing angle can be achieved.

Although the embodiment of the present invention and its modification example have been described above, the present invention is not limited to the above embodiment, and the embodiment and its modification example can be further modified. For example, in the above embodiment, the surface light source device 20 is of an edge light type, for example. However, the surface light source device 20 may be of a direct type.

Figure 17:
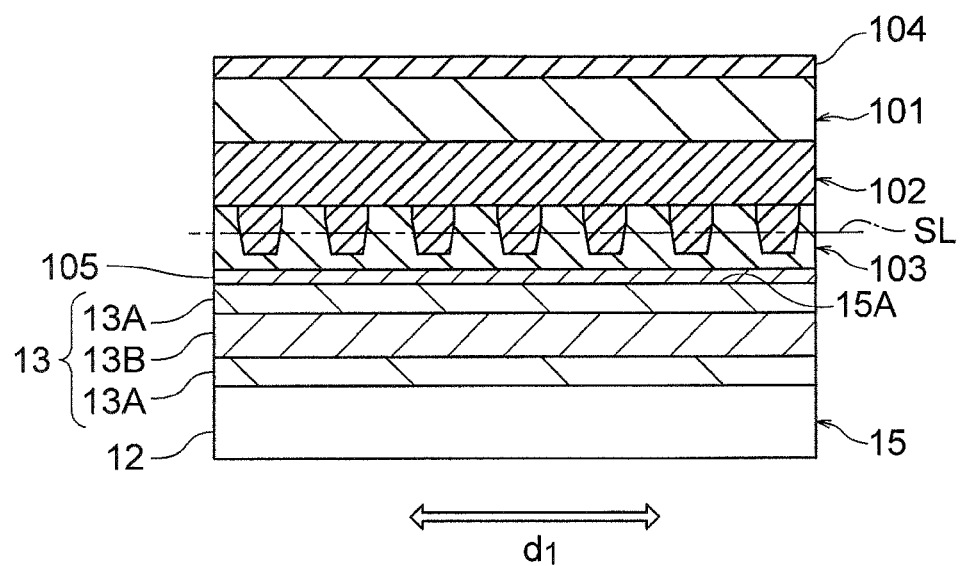
FIG. 17 is a schematic sectional view of a modification example of the display device according to the embodiment.

In addition, in the above embodiment, the low refractive-index layer 103 functions as an adhesive layer, and is joined to the display surface 15A of the liquid crystal panel 15. However, as shown in FIG. 17, the low refractive-index layer 103 may be joined to the display surface 15A of the liquid crystal panel 15 through an adhesive layer 105. In FIG. 17, a sectional structure of the upper polarizing plate 13 is shown in detail. The upper polarizing plate 13 shown in FIG. 17 is formed by disposing a polarizing plate body 13B between a pair of support layers 13A made of triacetyl cellulose or the like. Alternatively, the low refractive-index layer 103 may be joined to the display surface 15A of the liquid crystal panel 15r through an adhesive layer.

Figure 18:
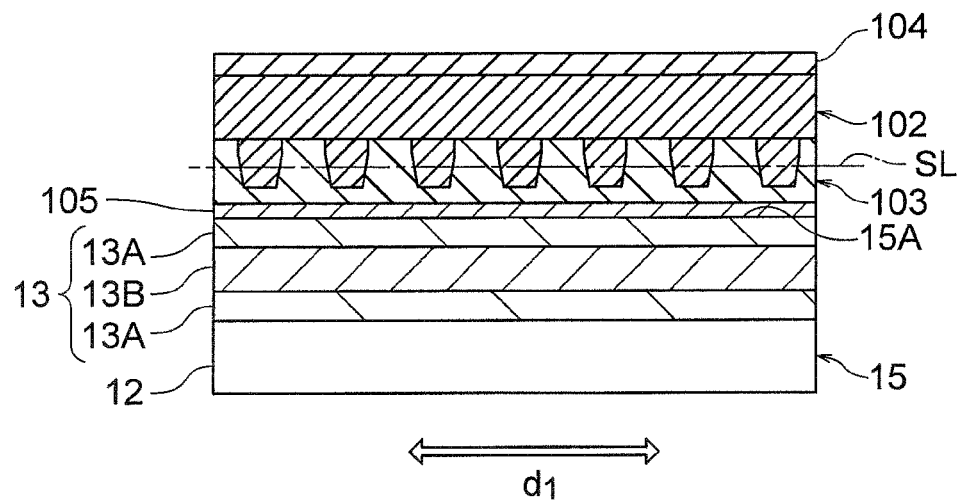
FIG. 18 is a schematic sectional view of a modification example of the display device according to the embodiment.

In addition, in the above embodiment, the base member 101 is disposed between the high refractive-index layer 102 and the antireflection layer 104. However, as shown in FIG. 18, the antireflection layer 104 may be provided directly on the high refractive-index layer 102.

Figure 19:
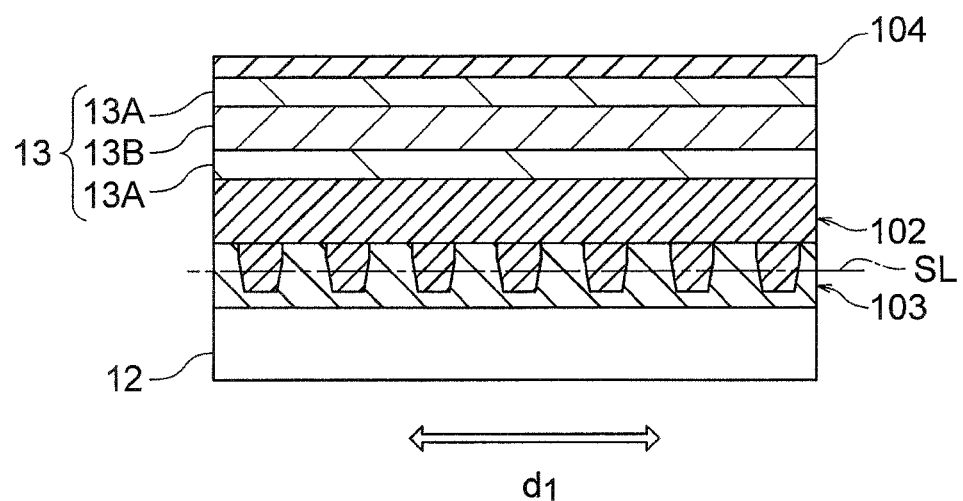
FIG. 19 is a schematic sectional view of a modification example of the display device according to the embodiment.

In addition, in the above embodiment, the high refractive-index layer 102 and the low refractive-index layer 103 are disposed nearer to the light emergent side than the upper polarizing plate 13. However, as shown in FIG. 19, the high refractive-index layer 102 and the low refractive-index layer 103 may be disposed between the upper polarizing plate 13 and the liquid crystal layer 12.

Figure 20:
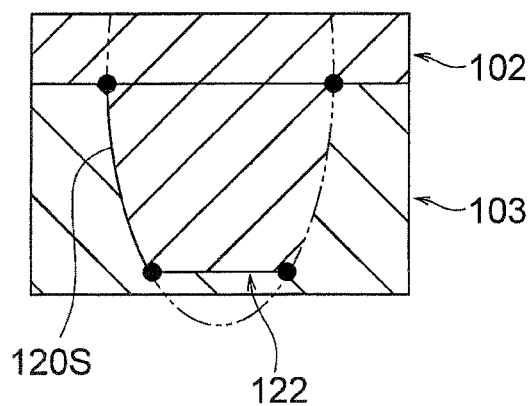
FIG. 20 is a schematic sectional view of a modification example of the optical structure according to the embodiment.

In addition, in the above embodiment, only the structure in which the side surface S is a curved surface defining an arc of a precise circle is shown. However, as shown in FIG. 20, the side surface 120S may be formed along an arc of an ellipse. In this case, the "inclination angle range α", which is defined by a difference between the maximum angle θ2 and the minimum angle θ1, which are defined between the side surface S and a normal direction of the high refractive-index layer 102 and the low refractive-index layer 103, can be increased, an advantage in that the side surface 120S capable of diffusion light widely can be made compact can be obtained.

LIST OF REFERENCE DESIGNATIONS

10 Display device
12 Liquid crystal layer
13 Upper polarizing plate
14 Lower polarizing plate
15 Liquid crystal panel
15A Display surface
15B Back surface
20 Surface light source device
21 Light-emitting surface
24 Light source
25 Point-like light-emitting element
28 Reflection sheet
30 Light guide plate
60 Optical sheet
100 Optical structure
101 Base member
101A Emergent surface
101B Back surface
102 high refractive-index layer
103 low refractive-index layer
104 Antireflection layer
110 Lens part
120 Concave-and-convex shape
120S Side surface
121 Concavity
121A Flat portion
122 Convexity
122A Flat portion

The invention claimed is:

1. An optical structure to be disposed on a display surface of a display device, comprising:
 a high refractive-index layer;
 a low refractive-index layer laminated on the high refractive-index layer, and having a refractive index lower than that of the high refractive-index layer; and
 a surface member disposed on the high refractive-index layer on a side opposite to the low refractive-index layer;
 wherein:
 an interface between the high refractive-index layer and the low refractive-index layer has a concave-and-convex shape;
 each of a concavity and a convexity in the concave-and-convex shape has a flat portion extending in a surface direction of the high refractive-index layer and the low refractive-index layer;
 two of side surfaces of the concave-and-convex shape, which are adjacent to each other and extend between the flat portion of the concavity and the flat portion of the convexity, form a tapered shape tapering toward a direction in which the concavity is recessed or a direction in which the convexity projects;

the low refractive-index layer is configured to be disposed to face the display surface of the display device;

an outermost layer of the optical structure on a side opposite to the display surface of the display device has a refractive index of not less than 1.30 and not more than 1.36, the outermost layer forming an air interface; and a ratio of a length of the flat portion, which faces the display surface of the display device, with respect to a length of one cycle of the concavity and the convexity of the concave-and-convex shape is not less than 0.19 and not more than 0.45.

2. The optical structure according to claim 1, wherein $\beta$ is defined by a ratio of a total length of the flat portions with respect to a length of one cycle of the concavity and the convexity of the concave-and-convex shape;

an inclination angle range $\alpha$ is defined by a difference between a maximum angle and a minimum angle, which are defined between the side surface of the concave and convex shape and a normal direction of the high refractive index layer and the low refractive index layer; and the inclination angle range $\alpha$ is not less than 83.33$\beta$−59.67 degrees and not more than 80$\beta$−44 degrees.

3. An optical structure to be disposed on a display surface of a display device, comprising:

a high refractive-index layer;

a low refractive-index layer laminated on the high refractive-index layer, and having a refractive index lower than that of the high refractive-index layer; and a surface member disposed on the high refractive-index layer on a side opposite to the low refractive-index layer;

wherein:

an interface between the high refractive-index layer and the low refractive-index layer has a concave-and-convex shape;

each of a concavity and a convexity in the concave-and-convex shape has a flat portion extending in a surface direction of the high refractive-index layer and the low refractive-index layer;

two of side surfaces of the concave-and-convex shape, which are adjacent to each other and extend between the flat portion of the concavity and the flat portion of the convexity, form a tapered shape tapering toward a direction in which the concavity is recessed or a direction in which the convexity projects;

the low refractive-index layer is configured to be disposed to face the display surface of the display device;

an outermost layer of the optical structure on a side opposite to the display surface of the display device has a refractive index of not less than 1.30 and not more than 1.36, the outermost layer forming an air interface; and wherein $\beta$ is defined by a ratio of a total length of the flat portions with respect to a length of one cycle of the concavity and the convexity of the concave-and-convex shape;

an inclination angle range $\alpha$ is defined by a difference between a maximum angle and a minimum angle, which are defined between the side surface of the concave and convex shape and a normal direction of the high refractive index layer and the low refractive index layer; and the inclination angle range $\alpha$ is not less than 83.33$\beta$−59.67 degrees and not more than 80$\beta$−44 degrees.

4. A display device in which the optical structure according to claim 1 is disposed on a display surface.

5. A display device in which the optical structure according to claim 3 is disposed on a display surface.

* * * * *